United States Patent
Babu et al.

(10) Patent No.: US 11,469,416 B2
(45) Date of Patent: Oct. 11, 2022

(54) BINDER FREE SILICON ELECTRODES FOR LITHIUM ION BATTERY OPERABILITY

(71) Applicant: Wayne State University, Detroit, MI (US)

(72) Inventors: Ganguli Babu, Detroit, MI (US); Khalid Ababtain, Dearborn, MI (US); Leela Mohana Reddy Arava, Farmington Hills, MI (US); Abdulrazzag Sawas, Dearborn, MI (US)

(73) Assignee: Wayne State University, Detroit, MI (US)

( * ) Notice: Subject to any disclaimer, the term of this patent is extended or adjusted under 35 U.S.C. 154(b) by 7 days.

(21) Appl. No.: 16/151,906

(22) Filed: Oct. 4, 2018

(65) Prior Publication Data
US 2019/0165371 A1 May 30, 2019

Related U.S. Application Data

(60) Provisional application No. 62/568,425, filed on Oct. 5, 2017.

(51) Int. Cl.
*H01M 4/38* (2006.01)
*H01M 4/505* (2010.01)
(Continued)

(52) U.S. Cl.
CPC ............ *H01M 4/386* (2013.01); *H01M 4/38* (2013.01); *H01M 4/387* (2013.01); *H01M 4/405* (2013.01);
(Continued)

(58) Field of Classification Search
CPC ........ H01M 4/38; H01M 4/386; H01M 4/387; H01M 4/405; H01M 4/463; H01M 4/505;
(Continued)

(56) References Cited

U.S. PATENT DOCUMENTS

| 5,314,765 A | 5/1994 | Bates |
| 5,338,625 A | 8/1994 | Bates et al. |

(Continued)

FOREIGN PATENT DOCUMENTS

| WO | 199209117 A1 | 5/1992 |
| WO | WO 92-09117 * | 5/1992 |

(Continued)

OTHER PUBLICATIONS

Ashassi-Sorkhabi et al., "Electrodeposition of three dimensional-porous Ni/Ni(OH)2 hierarchical nano composite via etching the Ni/Zn/Ni(OH)2 precursor as a high performance pseudocapacitor," Chemical Engineering Journal 299 (2016), pp. 282-291.*

(Continued)

*Primary Examiner* — Brittany L Raymond
(74) *Attorney, Agent, or Firm* — Fishman Stewart PLLC

(57) ABSTRACT

Disclosed herein is a lithium ion battery which operates stably at high temperatures. The battery disclosed herein has a chemical composition amenable to long-term operation at elevated temperatures and employs a lithium-based cathode, a silicon-based anode, and a piperidinium-based electrolyte solution.

21 Claims, 18 Drawing Sheets

(51) Int. Cl.
  *H01M 4/58* (2010.01)
  *H01M 10/0569* (2010.01)
  *H01M 4/587* (2010.01)
  *H01M 10/0525* (2010.01)
  *H01M 4/40* (2006.01)
  *H01M 10/052* (2010.01)
  *H01M 10/0568* (2010.01)
  *H01M 4/46* (2006.01)

(52) U.S. Cl.
  CPC ........... *H01M 4/463* (2013.01); *H01M 4/505* (2013.01); *H01M 4/58* (2013.01); *H01M 4/587* (2013.01); *H01M 4/5825* (2013.01); *H01M 10/052* (2013.01); *H01M 10/0525* (2013.01); *H01M 10/0568* (2013.01); *H01M 10/0569* (2013.01); *H01M 2300/0045* (2013.01)

(58) Field of Classification Search
  CPC ...... H01M 4/58; H01M 4/5825; H01M 4/587; H01M 10/052; H01M 10/0525; H01M 10/0568; H01M 10/0569; H01M 2300/0045
  See application file for complete search history.

(56) References Cited

U.S. PATENT DOCUMENTS

| | | |
|---|---|---|
| 5,512,147 A | 4/1996 | Bates et al. |
| 5,567,210 A | 10/1996 | Bates et al. |
| 2010/0248025 A1* | 9/2010 | Kimura ............ H01M 10/0565 429/207 |
| 2010/0291444 A1* | 11/2010 | Farmer ............... H01M 4/0404 429/322 |
| 2014/0186701 A1* | 7/2014 | Zhang .................. H01M 4/134 429/211 |
| 2014/0265557 A1 | 9/2014 | Huang et al. |
| 2014/0329126 A1* | 11/2014 | Ho ........................ H01M 4/364 429/128 |
| 2015/0207148 A1* | 7/2015 | Kimura .................. H01G 11/24 429/199 |
| 2015/0295235 A1* | 10/2015 | Kim ...................... C01B 33/021 429/218.1 |
| 2018/0294518 A1* | 10/2018 | Hong ................... H01M 4/583 |
| 2018/0316014 A1* | 11/2018 | Dash ................... H01M 4/1397 |
| 2020/0028166 A1* | 1/2020 | Tanaka ................. H01M 4/623 |

FOREIGN PATENT DOCUMENTS

| | | | |
|---|---|---|---|
| WO | 2004025757 A2 | | 3/2004 |
| WO | WO 2004-025757 | * | 3/2004 |
| WO | 2010035919 | | 4/2010 |
| WO | 2013142287 | | 9/2013 |

OTHER PUBLICATIONS

Wang et al., "Understanding and Recent Development of Carbon Coating on LiFePO4 Cathode Materials for Lithium Ion Batteries," Energy & Environment Science, Issue 1, 2012, 5, 5163-5185.*

* cited by examiner

BINDER FREE SILICON ELECTRODES FOR LITHIUM ION BATTERY OPERABILITY

BACKGROUND

The present application generally relates to electrochemical cells and batteries thereof, including electrochemical cells containing lithium.

Presently, lithium containing batteries, such as lithium-ion batteries (LIBs) are employed in portable electronics, such as for use in hybrid electric vehicles, oil drilling tools, medical appliances, oil, gas field sensors, and the like. Batteries for high-temperature applications with operability over 60° C. are currently dominated by primary batteries which rely on toxic chemistries, such as metallic lithium and thionyl chloride. Though conventional rechargeable energy storage technologies, including high energy density lithium-ion batteries perform at ambient temperatures, those presently available can experience failure under heat due to a number of causes, including but not limited to thermal instability in their electrodes, electrolytes, and the interface of these, namely a solid-electrolyte interface (SEI).

Towards an extendable temperature operability of LIBs, room temperature ionic liquids (RTILs) have emerged as a potential alternative to flammable organic electrolytes due to their negligible vapor pressure and chemical stability. However, current RTILs suffer from poor anodic compatibility at high temperature. For example, cations of RTILs can become intercalated in conventional graphite anodes, which in turn can result in poor electrochemical performance. Hence, the development of thermally stable anodes with stable SEI will help make progress in LIBs for extendable temperature applications.

In this context, $Li_4Ti_5O_{12}$ (LTO) was studied extensively to replace the carbon materials owing to its zero-strain structure and high lithium insertion potential (1.55 V vs. $Li/Li^+$), resulting in thermal stability and resisting electrolyte decomposition. Despite the safety advantages of LTO, low lithium storage capability (160 mAh/g) and prosaic operational cell potential (~1.85 V vs. $LiFePO_4$) hold this material back from widespread adoption in commercial applications. For example, in one report, a $LiFePO_4$/$Li_4Ti_5O_{12}$ full cell showed only 50-60 Wh/kg, which is only slightly more than a nickel/metal hydride (Ni/MH) battery. As a result, the commercial impact of $Li_4Ti_5O_{12}$ as anode in the market is limited and the search for an alternative anode continues for high-temperature lithium-ion battery applications.

It has been a challenge to develop lithium-ion batteries operable at higher temperatures in order to expand their applications beyond portable electronics and electric vehicles.

SUMMARY

In one aspect, the present disclosure provides an electrochemical cell including a cathode which includes lithium; an anode, the anode having a porous structure and including at least one of silicon, germanium, aluminum, phosphorous, tin, and an alloy of at least one of these materials with lithium; and an ionic liquid electrolyte in contact with the cathode and the anode. The cell may be incorporated into a lithium ion battery. The lithium ion battery may include a silicon anode, such as a 3D silicon anode, and may include a piperidinium-based electrolyte solution.

In another aspect, the present disclosure provides a lithium ion battery which is operable up to a temperature of about 300 degrees, or about 250 degrees, or about 200 degrees, or about 150 degrees.

In a further aspect, the present disclosure provides a method of making a lithium ion cell.

In another aspect, the present disclosure provides an electrochemical cell which includes a cathode including one of lithium/oxygen and lithium/sulfur; an anode, the anode having a porous structure and including at least one of silicon and lithiated silicon; and an ionic liquid electrolyte in contact with the cathode and the anode.

In another aspect, the present disclosure provides an electrochemical cell including a cathode which includes at least one of $LiFePO_4$ and $LiMn_2O_4$; an anode having a porous structure and including at least one of silicon, germanium, aluminum, phosphorous, and tin; and an ionic liquid electrolyte in contact with the cathode and the anode, the ionic liquid including at least one of pyrrolidinium, phosphonium, and piperidinium, such that the electrode is operable at a temperature of 100 degrees Celsius.

Further objects, features and advantages of this system will become readily apparent to persons skilled in the art after a review of the following description, with reference to the drawings and claims that are appended to and form a part of this specification.

DETAILED DESCRIPTION

Figure 1A:
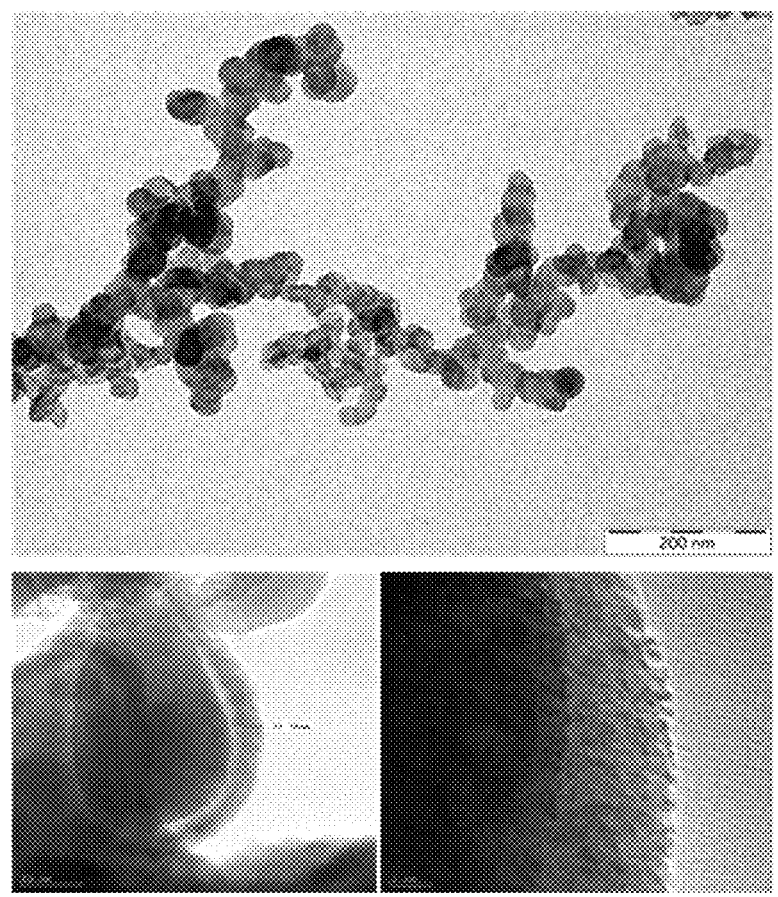
FIG. 1A is a transmission electron micrograph of clusters of nanoparticles synthesized according to the principles of the present disclosure.

The terms "substantially" or "about" used herein with reference to a quantity includes variations in the recited quantity that are equivalent to the quantity recited, such as an amount that is equivalent to the quantity recited for an intended purpose or function. "Substantially" or derivatives thereof will be understood to mean significantly or in large part. When used in the context of a numerical value or range set forth, "about" or "substantially" means a variation of ±15%, or less, of the numerical value. For example, a value differing by ±15%, ±14%, ±10%, or ±5%, among others, would satisfy the definition of "about."

Next-generation silicon anodes can be created by morphing the three-dimensional porous structure for high-temperature applications with propylene carbonate (PC)-RTIL based electrolyte. Though a first attempt was successful up to 100° C. using Li/Li+ (infinite lithium ions), the structural integrity of silicon electrodes and corresponding solid electrolyte interface (SEI), in conjunction with the practically viable cathode (limited lithium ions), is unknown. Stabilizing the silicon electrode interface aids in obtaining reliable electrochemical performance, as the electrolyte tends to decompose continuously.

Studies attempted so far to stabilize SEI on silicon electrodes are in a half-cell configuration wherein silicon is cycled against an unlimited lithium-ion source (metallic lithium). The few studies that have reported the performance of a silicon electrode and its associated formation cycle in full cell configurations have been limited to room temperature applications.

Silicon is an attractive candidate for negative electrode material for LIBs because it has higher thermal stability and its lithiation potential is close to that of carbon anodes (~0.3 V vs Li/Li+). Further, the theoretical capacity of silicon is 10 times that of carbon anodes (4200 mAh/g). Also suitable are tin, germanium, silicon, aluminum, and so forth, as well as their alloys. A dimensionally-engineered porous current collector made of such materials (such as silicon) is disclosed herein. Such a dimensionally engineered porous negative electrode hosts a high level of active anode material while exhibiting good mechanical stability during volume changes commonly observed during the charge/discharge process. Such a dimensionally engineered porous construction may allow for binders to be eliminated, to be binder-free. As used herein, the term "binder free" means "without a polymeric binding agent." Such binders are generally electrochemically inactive, and in some cases merely serve as "dead weight to the electrode. When binders and conductive additives are not used, their obligatory electrode preparation process is also not employed, and the active material loading per unit area is increased.

The materials used may be dimensionally controlled in a number of ways. For instance, they may be made of at least one of silicon, tin, aluminum, or germanium, individually or alloyed with lithium. They may be formed as three-dimensional nanoporous, microporous, or mesoporous structures; two-dimensional nanowires; nanofibers; hollow spheres; nanoparticles; and so forth.

A $LiFePO_4$ cathode provides structural stability originating from stronger bonds between metal to oxygen through phosphorus compared to that in, for example, $LiCoO_2$, wherein oxygen is directly bonded to the metal and readily released at higher temperature. The use of $LiFePO_4$ does not only provide thermal stability but also reduces cost and environmental concerns compared to cobalt-based cathodes. However, poor ionic and electronic conductivity and thermodynamically feasible impure phosphate phases are improved by carbon coating and optimization during synthesis of $LiFePO_4$. Other materials that can convey structural stability for the cathode include, for example, $LiMn_2O_4$, and other layered mixed metal oxides.

To fabricate 3D silicon electrodes in a full cell configuration, an olivine structured $LiFePO_4$/C composite cathode (LFP) is used due to its $PO_4^{3-}$ polyanion driven structural and thermal stability. Citric acid assisted sol-gel chemistry route may be used to prepare a conductive carbon coated nano-sized LFP composite to overcome conductivity issues. Prior to constructing the full cell lithium-ion battery, the LFP composite cathode is tested thoroughly against Li/Li+ for its stability at high temperature. The recorded X-ray diffraction pattern is matched to the orthorhombic phase of LFP (JCPDS File No.: 81-1173) (FIG. 1E) without any impure phases. From transmission microscopy images (FIG. 1A), clusters of nanoparticles with spherical shape are observed for LFP synthesized at 700° C. The formation of narrowly distributed nanoparticles (<100 nm) with uniform size is attributed to the chelating agent (citric acid) of the assisted sol-gel process, controlling the growth and wider distribution of particles via slow rate of heating (2° C. per minute) along with intermittent grinding. Similarly, high-resolution transmission microscopy (HRTEM) images of the LFP composite are furnished in FIG. 1a (bottom row). The study demonstrates that the residual carbon derived from starting precursors as well as from the gelling agent (citric acid) substantially uniformly cover the LFP particles as a thin layer. This uniform coating of the carbon layer on the nanoparticles has a thickness of less than about 8 nanometers and advances the conductivity and electrolyte percolation by interconnecting the LFP particles.

Figure 1B:
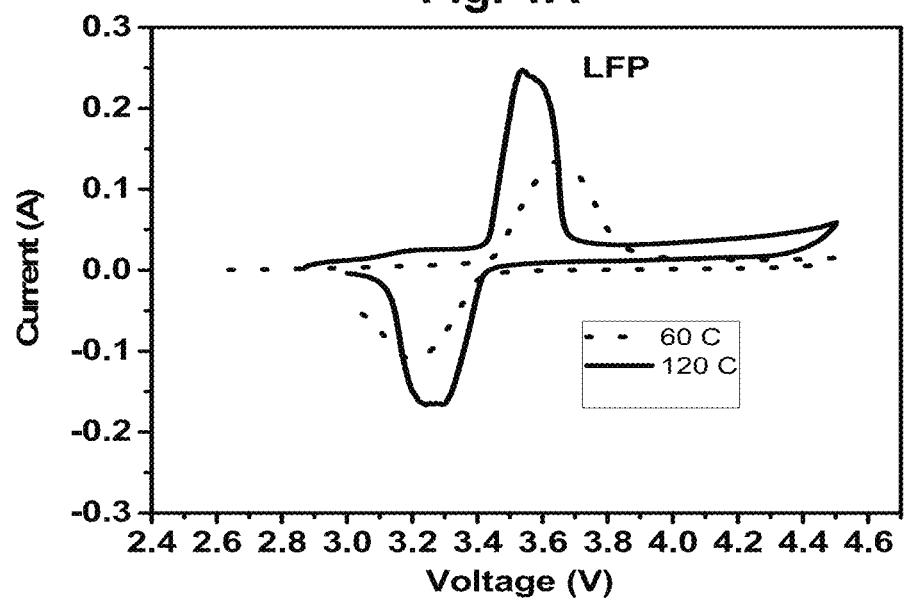
FIG. 1B illustrates cyclic voltammograms of LiFePO4/C cathode at different temperatures.
Figure 1C:
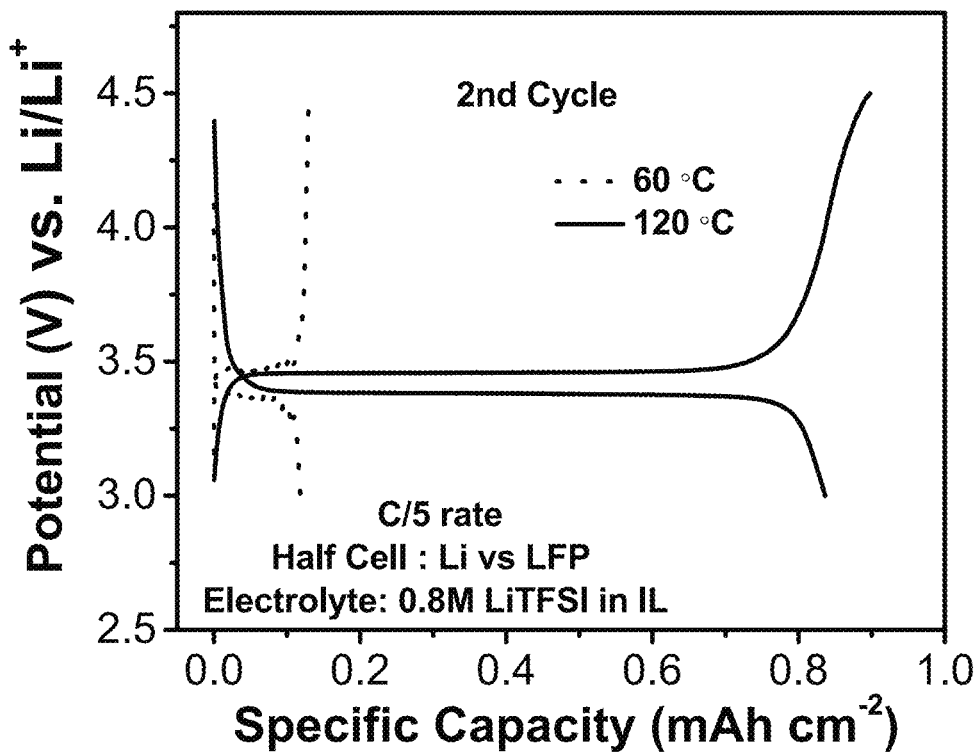
FIG. 1C shows representative charge-discharge profiles of LiFePO4/C cathode vs. Li/Li+ cathode at 60° C. and 120° C.
Figure 1D:
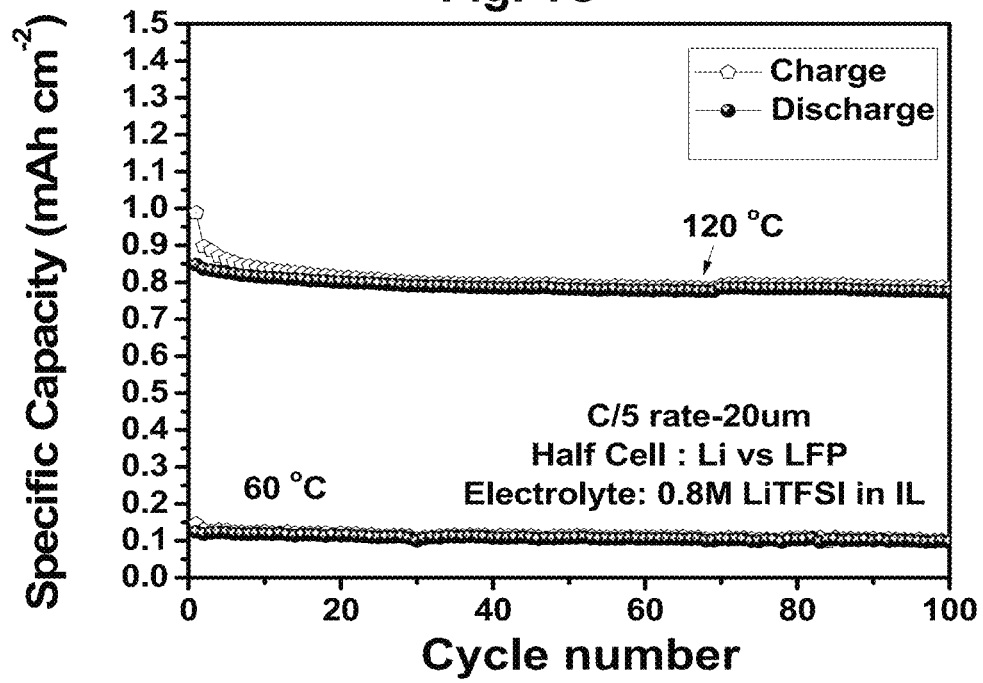
FIG. 1D shows the cycle life of LiFePO4/C cathode vs. Li/Li+ cathode at 60° C. and 120° C.
Figure 1E:
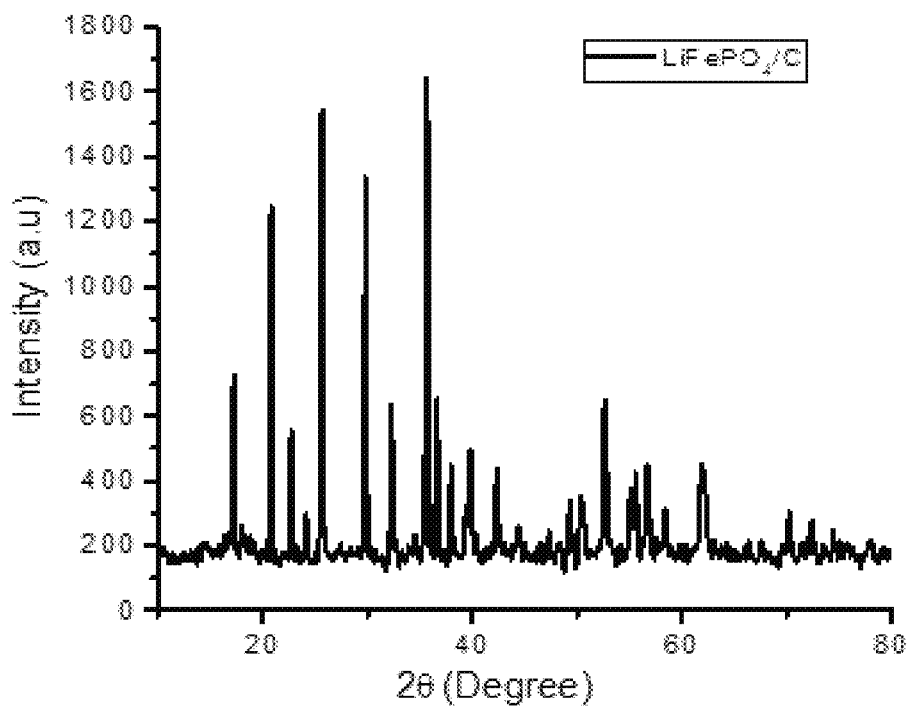

FIGS. 1b-d illustrate the electrochemical properties of a LFP composite cathode in a half-cell configuration with a RTIL electrolyte at 60° C. and 120° C. As shown in FIG. 1b, electrochemical activity (currents in CV) of LFP electrodes in a piperidinium-based ionic liquid (Pip) electrolyte increases with the increase of temperature due to change in ionic conductivity. As used herein, the term "piperidinium-based" means a molecule or a composition that contains a piperidinium moiety, in some cases as a cation in the electrolyte system. The observed redox peaks for LFP cathode at 3.25 and 3.65 V corresponds to a one-step reversible de-intercalation and intercalation of lithium ions into $FePO_4$ phase ($LiFePO_4/FePO_4$) at all the studied temperatures, indicating thermal stability. Likewise, phosphonium-based or pyrrolidinium-based RTIL may be included in such an electrochemical cell.

Other electrolyte liquids are suitable for use in an electrochemical cell constructed in accordance with the principles of the present disclosure. In one aspect, high boiling point organic solvents such as mono-, di-, tri-, and tetraethylene glycol may be used, or a mixture of RTIL and organic solvents. The electrolyte may include lithium salts, including but not limited to LiClO$_4$, LiBF$_4$, LiCF$_3$SO$_3$, LiN(CF$_3$SO$_2$)$_2$, LiAsF$_6$, LiN(CF$_3$CF$_2$SO$_2$)$_2$, LiBOB, and the like.

Optionally, separator/electrolytes may be included in the electrochemical cell, such as polypropylene, quartz membranes, polymer membranes, inorganic membranes, and hybrids of these materials, with the described ionic liquids.

Further, surface modifiers or electrolyte additives may be included in the electrochemical cell, in order to stabilize the dimensionally controlled anodes and the solid electrolyte interface (SEI) under extreme conditions. For instance, surface modifiers such as Al$_2$O$_3$, ZnO, TiO$_2$, ZrO$_2$, and conductive polymers may be employed, alone or in combination. Likewise, electrolyte additives such as LiNO$_3$, vinylene carbonate, phosphonate, acetates, polymers, and inorganic compounds may be used in the electrolyte, either as solids or as liquids, alone or in combination.

Galvanostatic charge-discharge experiments were conducted to understand the influence of the temperature on the specific capacity and cycle life. FIG. 1c depicts typical voltage vs. capacity plots of the LFP cathode, wherein well-defined charge and discharge plateaus were observed around 3.5/3.4 V. Insignificant changes with the rise in temperature confirm the thermal stability of the cathode due to its polyanion structure. The cycling behavior of currently prepared LFP cathodes at a 0.2° C. rate is illustrated in FIG. 1d. The specific capacity of 140 mAh g$^{-1}$ (0.8 mAh cm$^{-2}$) is exhibited even at 120° C. with consistent performance over 100 charge-discharge cycles. More notably, superior capacity retention (80%) and coulombic efficiency (99%) signify the potential of LFP cathode for high-temperature applications.

Figure 2A:
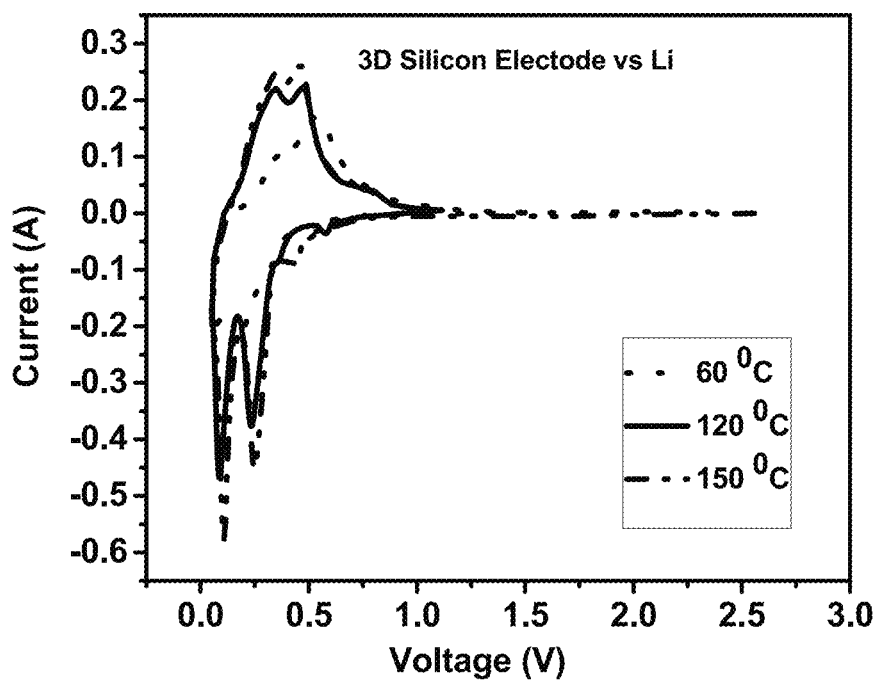
FIGS. 2A, 2B, 2C, and 2D provide graphical representations of the electrochemical behaviors of 3D silicon electrodes at high temperatures.

Electrochemical studies of 3D silicon electrodes were performed using Pip electrolyte in half cell configurations vs. Li/Li$^+$. Fabrication procedures of 3D Ni current collectors and 3D silicon electrodes with desired porosity and thickness have been reported previously. CV studies were conducted on (3D Si vs. Li) using Pip electrolyte at various temperatures ranging from 60 to 150° C. at a scan rate of 0.05 mV s$^{-1}$. As seen in FIG. 2a, electrochemical activity of 3D Si electrodes in a Pip electrolyte increases with the increase in temperature, potentially due to a decrease in viscosity of electrolyte. Lithiation in silicon at elevated temperatures can occur in two stages, at about 0.1V and 0.25V, associated with the formation of Li$_x$Si alloy phases. Similarly, anodic peaks around 0.3 and 0.49 V correspond to de-lithiation of silicon, signifying the reversible nature of system. At 60° C., slight shifts in the peaks corresponds to the low ionic conductivity of the Pip electrolyte, which improves with increasing the temperature. These two stage lithiation/de-lithiation peaks overlap with CV cycles at high temperature without altering their position, which confirms the stability of the silicon electrodes. The peaks at 0.5V, 0.55V, and 0.48 V at 60° C., 120° C. and 150° C., respectively, in the cathodic region (lithiation) attributed to the formation of the solid electrolyte interface (SEI) layer. Such results reveal that the decomposition of electrolyte to form SEI is temperature sensitive.

Figure 2B:
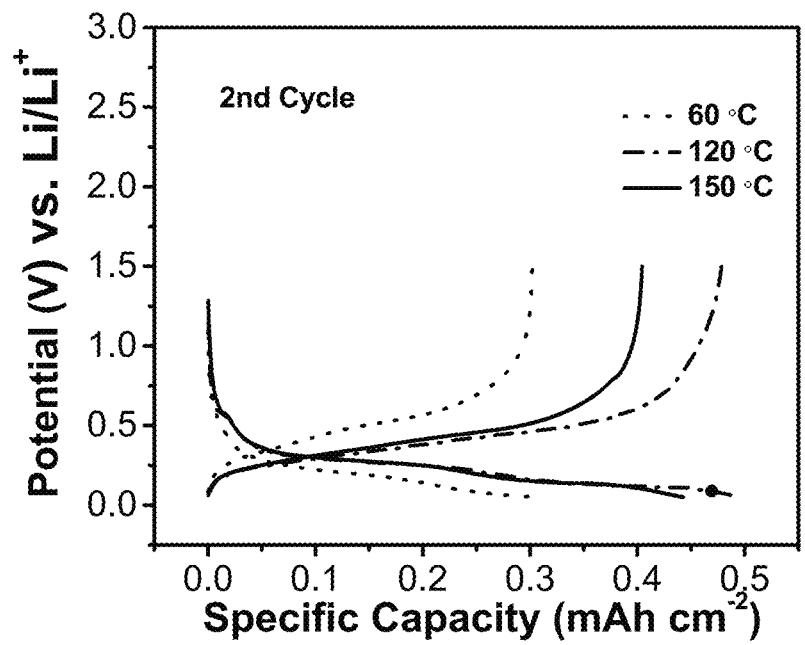
Figure 2C:
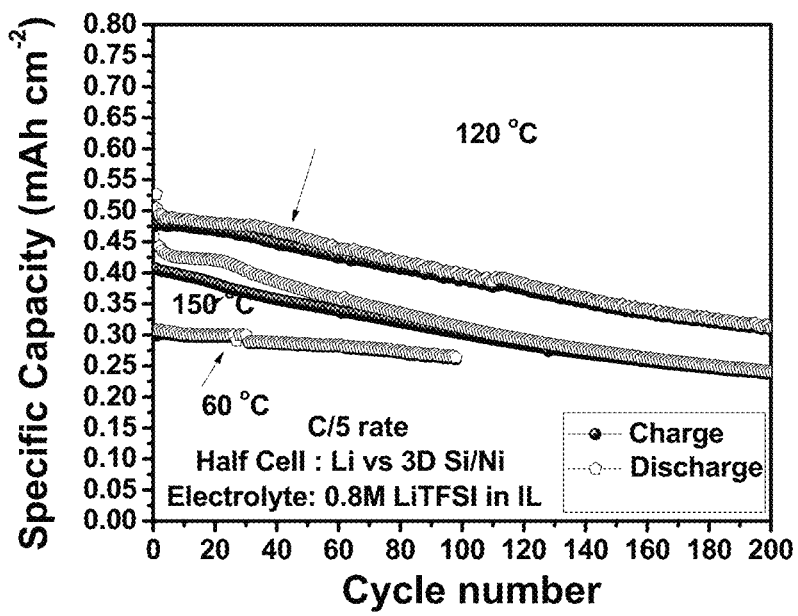
Figure 2D:
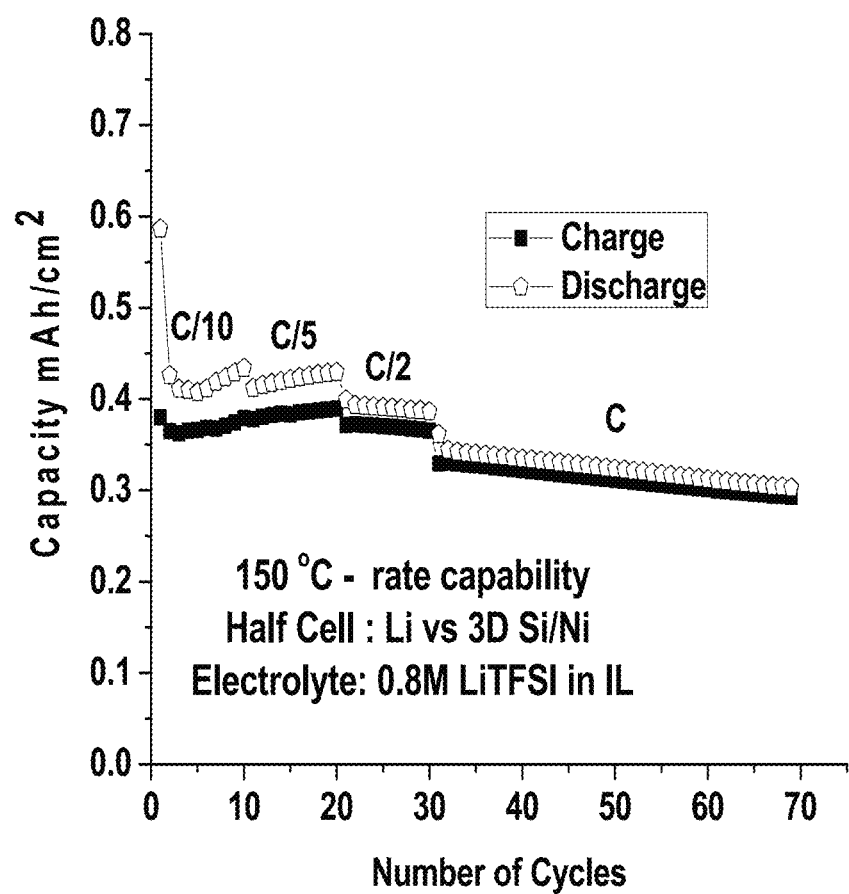

Typical charge-discharge profiles of silicon at different temperatures are illustrated in FIG. 2b. During the first discharge, there is a small plateau region around the potential of 0.6 V, and then a large stable plateau occurs well below 0.4 V, denoting SEI formation and lithium-silicon alloy formation respectively. In order to minimize volume expansion, which can affect electrode stabilization, a discharge cut-off voltage is constrained to 50 mV at the expense of deep discharge capacity. To evaluate the cycle life of 3D Si electrodes at high temperature up to 150° C., capacity vs. cycle number studies were conducted by operating cells at C/5-rate from 60° C. to 150° C. for 100 cycles. As shown in FIG. 2c, a 3D Si/Pip electrolyte/Li system exhibits excellent charge-discharge properties when operated at a high temperature above 60° C. For instance, the specific capacity values for 3D silicon vs. Li/Li+ at 60, 120 and 150° C. were 0.32, 0.49 and 0.44 mAh cm$^{-2}$ respectively. The rate capability of the 3D Si anode (FIG. 2d) was understood by conducting tests from C/10 to C rates at 150° C. The silicon anode in concert with the Pip electrolyte exhibited capacities of 0.43, 0.41, 0.4 and 0.35 mAh cm$^{-2}$ when the cell was operated at C/10, C/5, C/2 and 1 C respectively. Such stability in the capacity values at high rate (1 C) and high temperature (150° C.) is an indication of the suitability of silicon electrode for extreme conditions. The battery may also be stable and operable at a temperature of up to about 300 degrees Celsius, or up to about 250 degrees Celsius, or up to about 200 degrees Celsius, or up to about 180 degrees Celsius, or between about −40 degrees Celsius and 300 degrees Celsius. The battery or electrochemical cell may also be operable under high pressure conditions, such as up to 10000 pounds per square inch (psi).

In various aspects, the silicon anode can be a lithiated silicon anode. The anode may be binder-free, and as such there is no readily degradable element associated with the anode. In some aspects, the silicon anode may be fabricated as described by Gowda et al. (Nanoletters (2012), vol. 12, pp. 6060-6065) or Ababtain et al. (Applied Materials and Interfaces (2016), vol. 8, pp. 15242-15249), both of which are incorporated herein by reference, inclusive of their supplemental information.

Though the electrochemical performance of 3D Si as anode and LFP as a cathode using the Pip electrolyte in half cell configurations vs. Li/Li+ are excellent, the feasibility and operability of full cell (3D Si/Pip electrolyte/LFP) at various temperatures which depend on the stability of SEI on silicon remains unexplored. Towards this direction, SEI has been formed at different conditions; namely, galvanostatic mode, CC-CV mode (constant current and constant voltage), and potentiostatic mode (CV) at room temperature. To monitor charge-transfer resistance across such formed SEI, the fabricated full cells were subjected to an electrochemical performance test from room temperature to higher temperatures to reveal the practicability of the system.

Figure 3A:
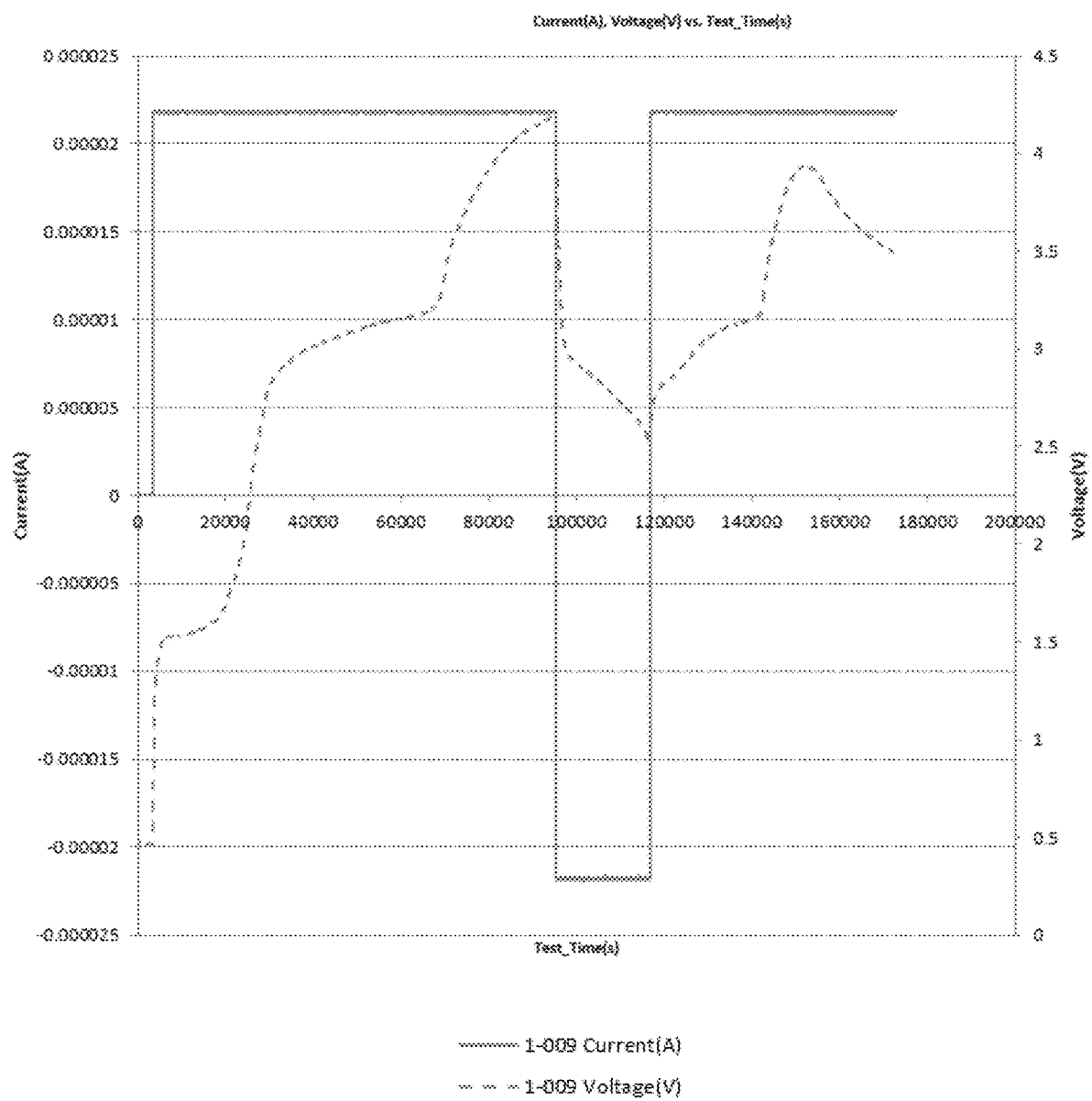
FIGS. 3A, 3B, 3C, 3D, 3E, and 3F are graphical representations of formation cycles at different conditions and their respective charge-transfer resistance.

During galvanostatic charge at low C-rate (C/20), the electrolyte solvent including salt decomposes effectively at the negative electrode to form a thin passivation layer on the anode. This process usually occurs at a lower potential in commercial lithium-ion batteries, which include an organic electrolyte and a graphite anode. Surprisingly, an electrolyte reduction process (SEI formation) occurs slightly at a higher potential (1.75 V vs. LFP) wherein RTIL based electrolyte and silicon electrode were used. Such behavior may be due to the chemical nature of RTIL electrolyte at room temperature on the comparatively less oxidative surface of the silicon electrode. Though electrolyte reduction (SEI formation) occurs in all three cases, the potential is sensitive to current rate and the mode of formation cycle. For instance, formation cycle forms potentiostatically exhibit electrolyte reduction at comparatively higher potential (2.0 V) compared to that of galvanostatic mode (1.6 V). FIG. 3a illustrates the charge-discharge behavior of full cell at C/20 wherein poor reversibility and large charge transfer resistance (FIG. 3d) are witnessed, possibly due to formation of SEI.

Figure 3B:
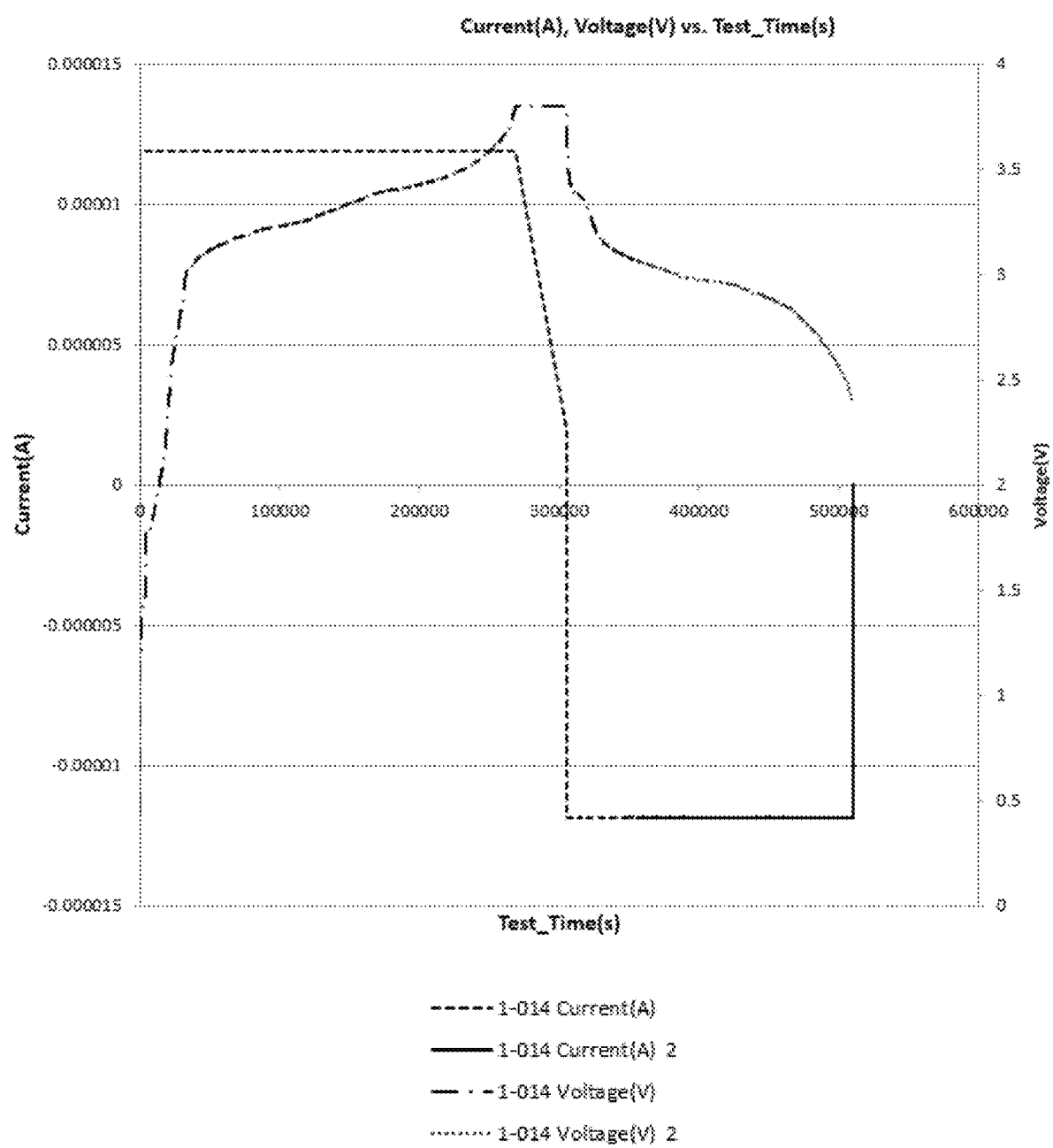
Figure 3C:
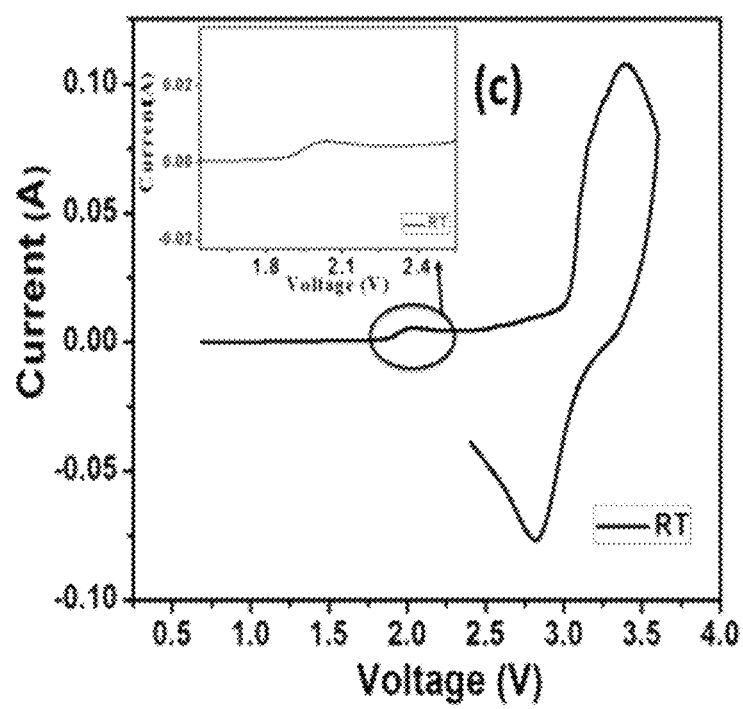
Figure 3D:
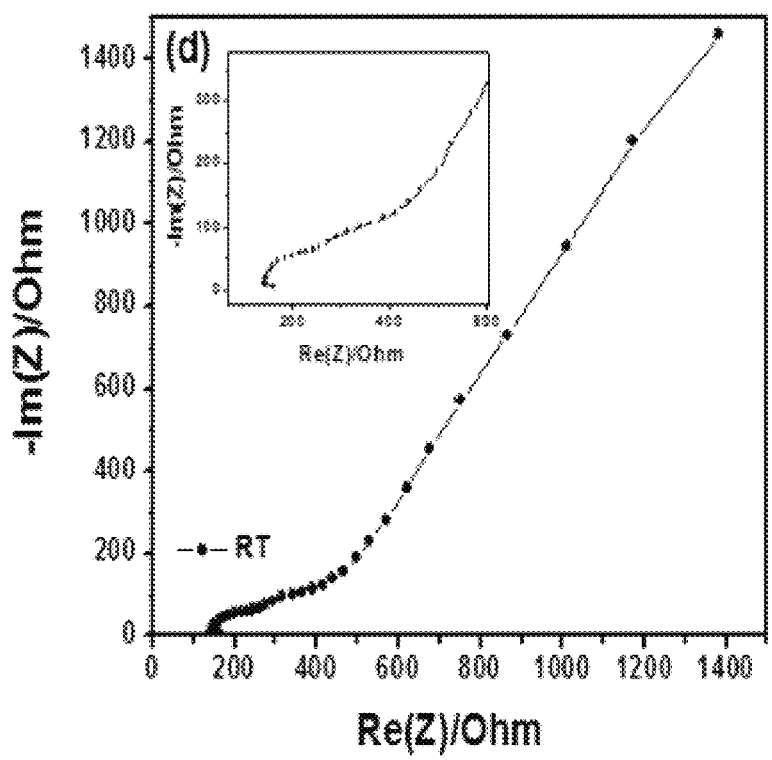
Figure 3E:
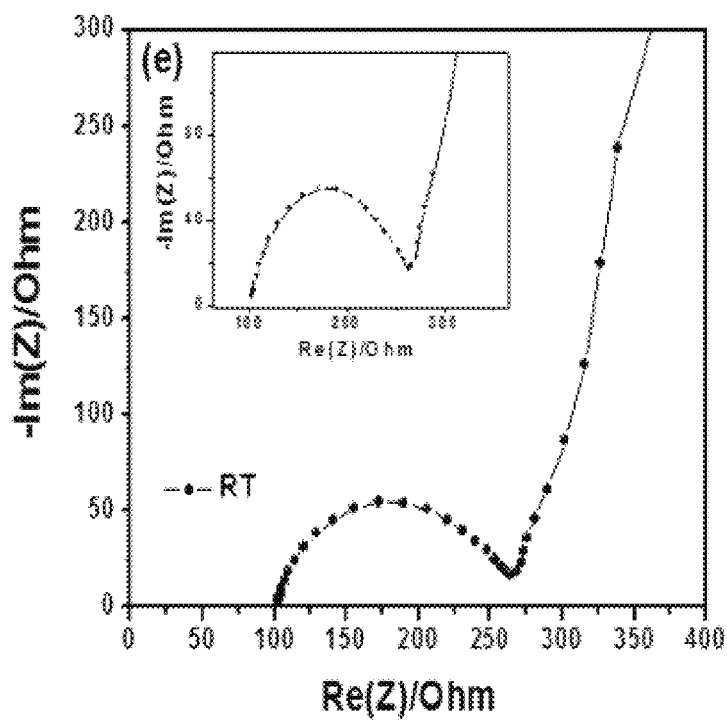
Figure 3F:
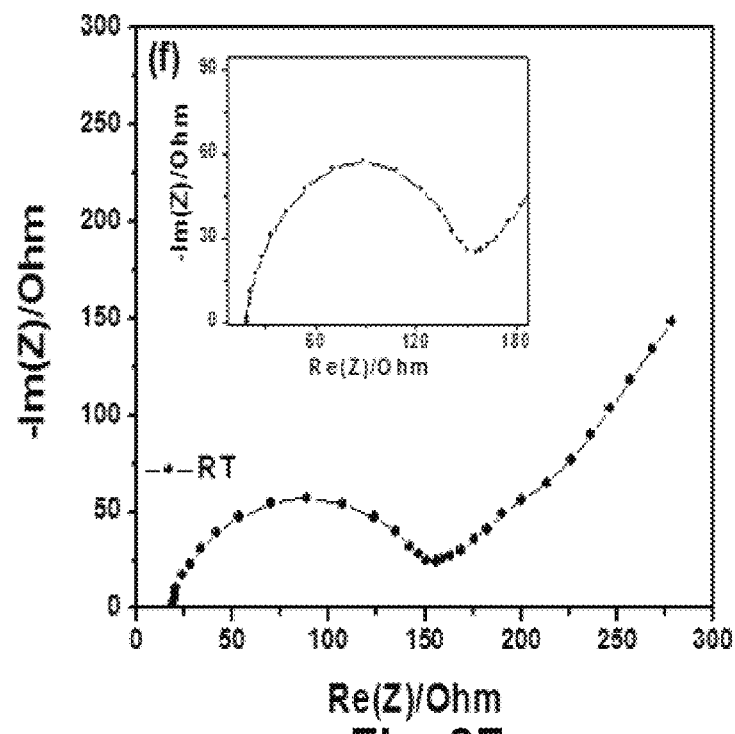

On the other hand, excellent reversibility with charge-discharge plateaus and CV peaks at an appropriate potential (3.2/3.0 V) has been observed in a full cell subjected to CC-CV mode (C/100) and potentiostatic mode (0.01 mV/s) (FIGS. 3B and 3C). The reduced charge-transfer resistance values for later studies compared to that of galvanostatic mode are evidence that the nature of the passivation layer influences reversibility in full cell configuration (FIGS. 3D and 3E). Specifically, the SEI formed from CV results in the lesser resistance value of 170 S) considering RTIL electrolyte and silicon electrode (FIG. 3F).

Based on reduced charge-transfer resistance at the electrode-electrolyte interface and excellent reversibility, further studies are performed on full cells with potentiostatically formed SEI at various temperatures (FIG. 4). Upon increasing the temperature, redox peaks of the full cell at 2.92/3.18 V evolved with regard to peak current and sharpening of redox peaks, due to a change in ionic conductivity of electrolyte (FIG. 4a). Moreover, the appearance of a second redox peak at 2.6/2.8 V from 60° C. indicates that the lithiation/delithiation of a full cell resembles a silicon half-cell electrode (Si vs. Li/Li+) wherein the Li—Si alloy/dealloy formation occurs at distinguished potentials with an increase in temperature. Though the intercalation potential for the LFP electrode is similar at all the studied temperatures, a full cell based on the same LFP electrode exhibits multiple redox peaks at higher temperatures. Such secondary redox peaks of the full cell, along with the primary redox peaks, are perfectly reversible in nature even upon repeated CV sweeps.

Figure 4A:
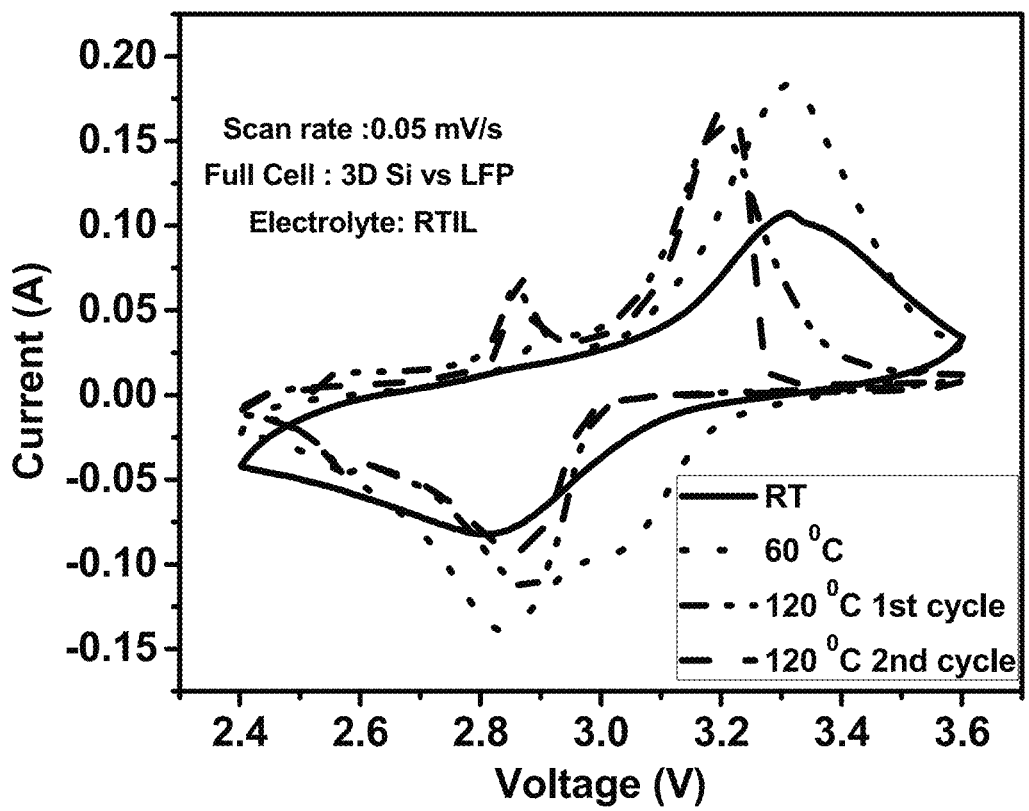
FIGS. 4A, 4B, 4C, and 4D are graphs characterizing lithium ion battery properties when constructed with 3D silicon vs. LiFePO4/C at different temperatures.
Figure 4B:
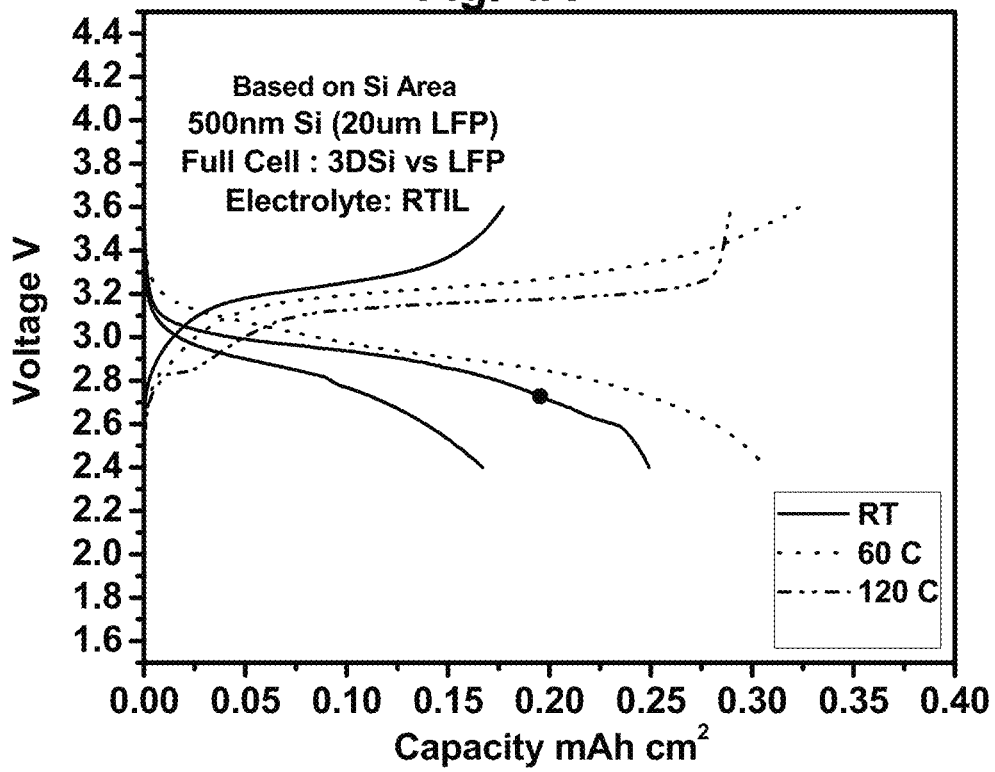

Typical charge-discharge profiles of the full cell (3D silicon Vs LFP) with Pip electrolyte at different temperature are illustrated in FIG. 4b. The aligned charge-discharge plateau at around 3V at all the temperatures evidence the potentiality of the system. A reversible discharge capacity of 0.18, 0.32 and 0.25 mAh cm$^{-2}$ for RT, 60° C., and 120° C. respectively, has been observed.

Figure 4C:
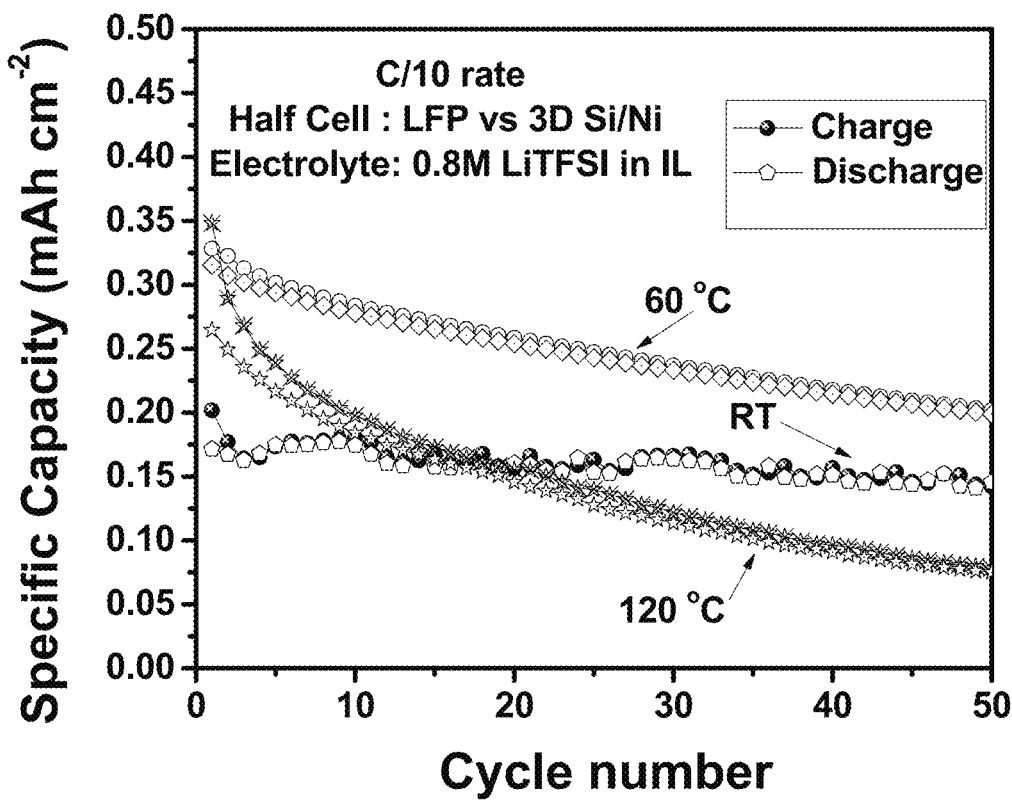
Figure 4D:
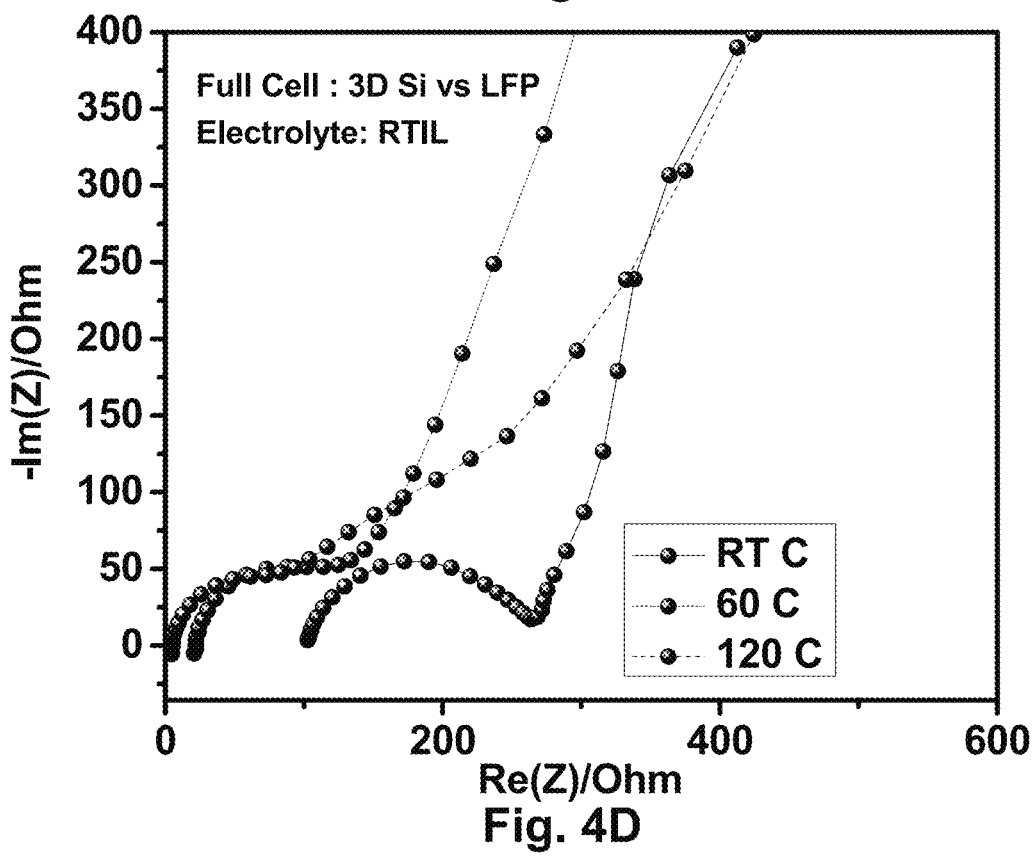

To measure the electrochemical cycling stability, capacity vs cycle number studies were conducted at a constant current rate of C/5 and at different temperatures from RT to 120° C. as shown in FIG. 4c. A silicon-based full cell delivers reversible specific capacity of 0.16 mAh cm$^{-2}$ for over a 50 charge-discharge cycles with appreciable capacity retention of 98%. The coulombic efficiency of the present system at RT is 99.2% indicates the compatibility of electrode-electrolyte and their interfaces. With the rise in temperature, the cell exhibits enhanced specific capacity values of 0.33 and 0.27 at initial cycle for 60° C. and 120° C. correspondingly as shown in FIG. 4d. At 60° C., the capacity retention for a full cell over 50 charge-discharge cycles is around 70%. Further, the stability of specific capacity over a repeated cycling even at high temperature (120° C.) is comparatively poor due to parasitic reactions at the electrode-electrolyte interface and may due to continuous formation of SEI on newly exposed silicon electrode surface. Coulumbic efficiency above 99% as an indicator of full cell feasibility is evident at all the studied temperatures.

At room temperature, Nyquist plots recorded after initial charge-discharge cycle showed high electrolyte resistance (100Ω) and charge transfer resistance (290Ω) attributed to the poor Li ionic conductivity of Pip electrolyte (FIG. 4d). Significantly reduced resistances (120Ω) have been observed at higher temperatures owing to enhanced ionic conductivity in electrolyte and temperature driven electrolyte decomposition during passivation layer formation of the silicon electrode.

Figure 4E:
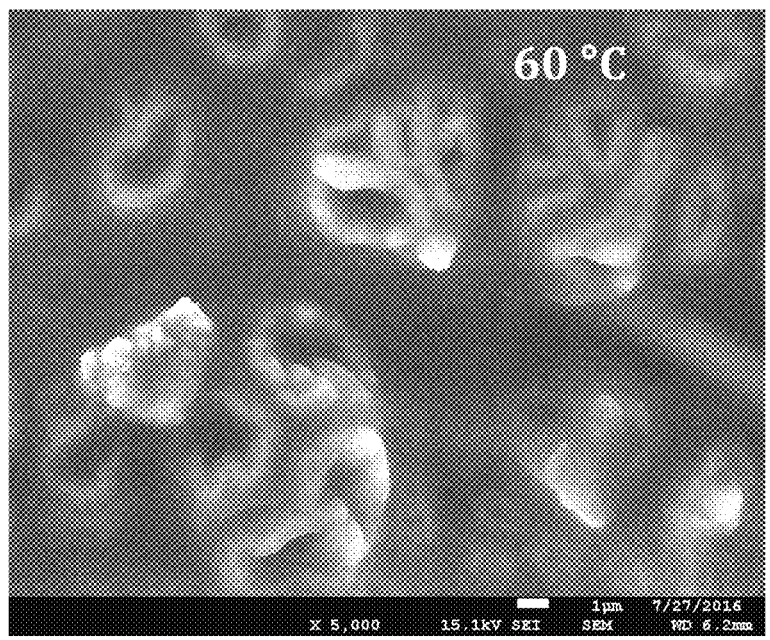
FIGS. 4E and 4F are scanning electron micrographs of cycled 3D silicon electrodes at 60 degrees and at 120 degrees.
Figure 4F:
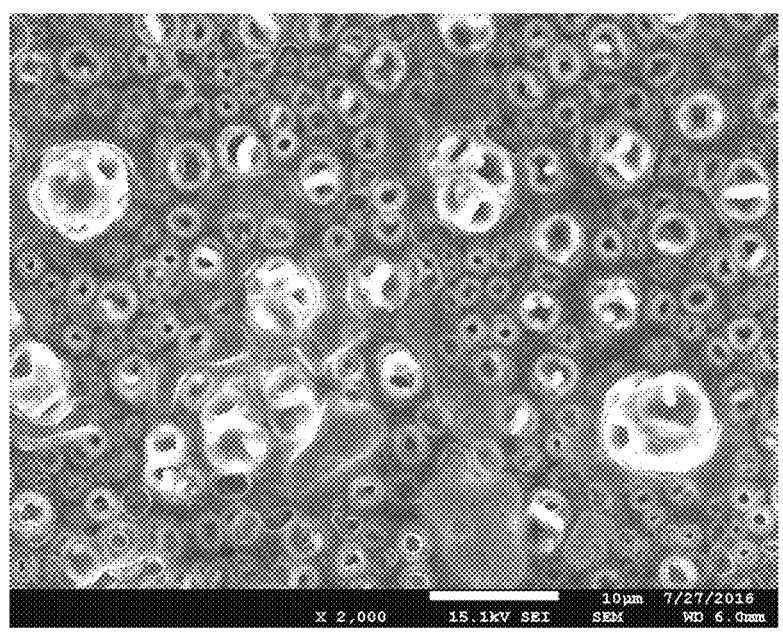
Figure 4G:
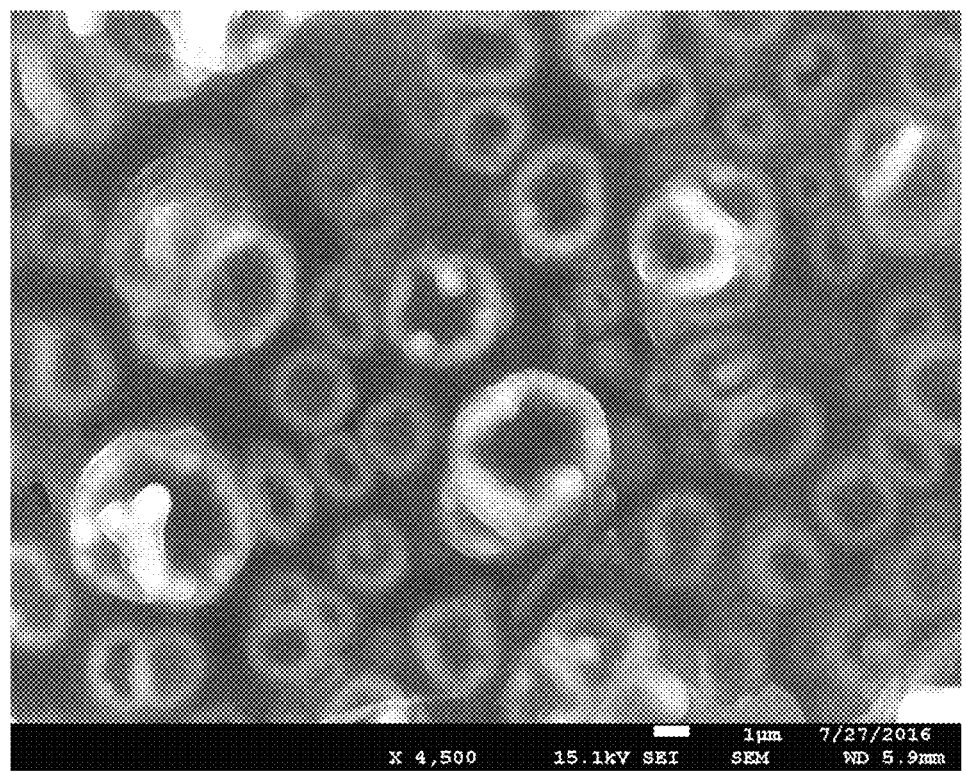
FIG. 4G is a scanning electron micrograph of a silicon electrode cycled at 150 degrees Celsius.

Silicon structural stability at higher temperatures was studied scanning electron images, which were recorded of the silicon electrodes after electrochemical cycling at different temperatures. FIG. 4e shows typical SEM images of 3D silicon, wherein the morphology of the electrode is stable even after 20 cycles at 60° C. Similarly, the 3D tubular morphology was invariable when temperature increased to 120 and 150° C. as shown in FIG. 4f and Supporting Information FIG. 4g respectively. Hence, structural integrity and robustness of binder free 3D silicon electrodes are developed in this study are potential electrodes for full cell configurations with a combination of thermally stable cathodes, especially for high-temperature applications.

The thermal stability and electrochemical performance of binder free silicone electrodes with different ionic liquid based electrolytes is also disclosed herein, as described in Table 1 below. The salts lithium bis(trifluoromethanesulfonyl)imide (LiTFSI) and lithium bis(oxalate)borate (LiBOB) were utilized in these studies, but other lithium salts may be substituted without departing from the spirit of the present invention.

TABLE 1

Thermal stability and electrochemical performance of binder free silicon electrodes with different ionic liquid based electrolytes

| Ionic Liquids | Li Salt | Temperature of Operation (° C.) | Initial specific capacity (mAh/g) |
|---|---|---|---|
| 1-methyl-1-propylpiperidinium bis(trifluoromethylsulfonyl)imide | 1M LiTFSI | Up to 300 | 2800 |
| 1-ethyl-1-methylpyrrolidinium bis(trifluoromethylsulfonyl)imide | 1M LiTFSI | Up to 200 | 2500 |
| Tributylmethylphosphonium bis(trifluoromethylsulfonyl)imide | 1M LiTFSI | Up to 180 | 1800 |
| 1-methyl-1-propylpiperidinium tetrafluoroborate | 0.4M LiBOB | Up to 300 | 2100 |

Developing a thermally stable anode that can work safely with compatible cathode and electrolyte would benefit developing lithium-ion batteries with extendable temperature applications. As described herein, a 3D silicon electrode exhibits not only high capacity in a conventional manner but also stability up to 150° C. in combination with RTIL electrolyte. The silicon electrode displays a capacity of 0.4 mAh cm$^{-2}$ (2000 mAh/g) at 150° C. with excellent capacity retention (~70%) and near perfect coulombic efficiency (>99%) for 200 charge-discharge cycles. Among various modes of formation cycle to form a passivation layer on silicon electrode, the potentiostatic method reveals the preferential reversibility, possibly due to reduced charge transfer resistance. Further, electrochemical properties of a silicon electrode in full cell configuration have been inferred using thermally stable LFP electrodes as a cathode. Such a system reveals exceptional stability at RT over 50 cycles with the capacity of 0.16 mAh cm$^{-2}$. The feasibility of currently studied full cell for high-temperature applications is explored by forming passivation layer at RT and the results are encouraging with high initial capacity of 0.27 mAh cm$^{-2}$ at 120° C.

The electrochemical cells and batteries described herein are distinct from conventional high temperature batteries, such a Li-metal based non-rechargeable and solid-state thin-film rechargeable batteries, as the latter pose safety and energy density concerns, respectively. The presently-disclosed cells and batteries deliver high energy and increased safety, as the dimensionally controlled high capacity electrodes as an alternative to Li-metal anodes may reduce or avoid dendrite formation. Furthermore, the elimination of binder and conductive additives simplifies the electrode preparation process. The presently described cells and batteries are rechargeable, high temperature batteries, with good volumetric energy density, and compatibility with high temperature stable electrolytes.

Figure 5A:
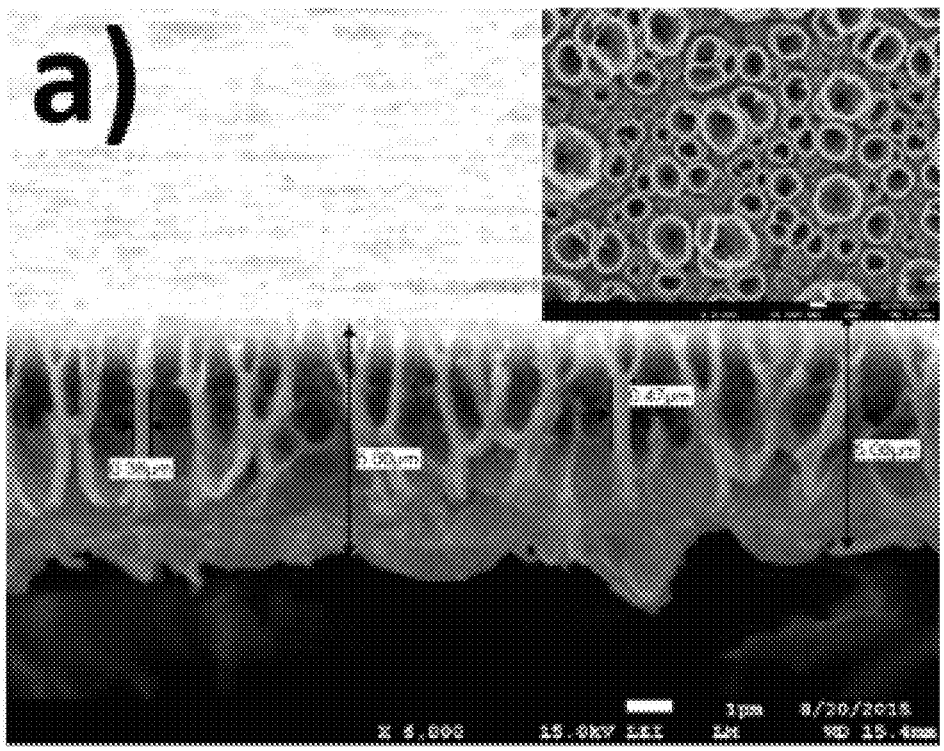
FIGS. 5A and 5B are cross sectional scanning electron micrograph images of porous Ni current collector and PECVD coated Si to form 3D porous electrodes, respectively.
Figure 5B:
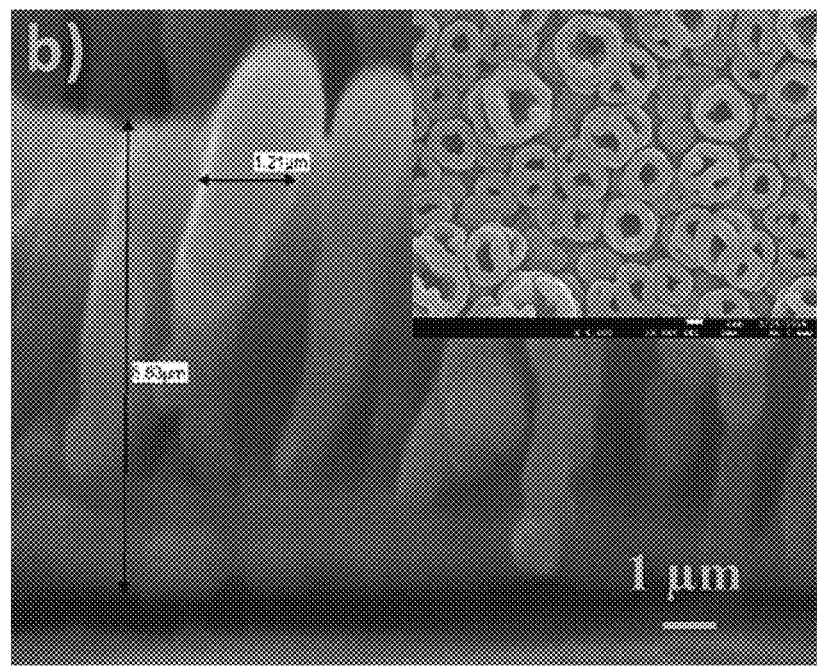

To eliminate explosive and expensive metallic lithium anode and to retain the performance of sulfur cathode, a high capacity 3D porous silicon electrode has been used to assemble high energy density Li-ion polysulfide battery. Silicon electrodes may be assembled with desired porosity using engineered Ni current collectors. Porous Ni current collectors may be prepared by selective etch-out of Cu component from electrodeposited Cu—Ni alloy. Then 3D silicon electrodes were attained by conformal coating of amorphous silicon on porous Ni using plasma enhanced chemical vapor deposition (PECVD) method. FIG. 5A shows the scanning electron microscopy (SEM) images corresponding to top view (inset) and cross-sectional view of porous nickel current collector deposited on stainless-steel substrate. The uniform pore size (~1 µm), pore distribution and thickness (~5 µm) have been achieved. Conformal coating of silicon on such current collectors has been performed with an optimized thickness of 0.5 µm, as confirmed from a thickness profiler and SEM images (FIG. 5B).

Figure 5C:
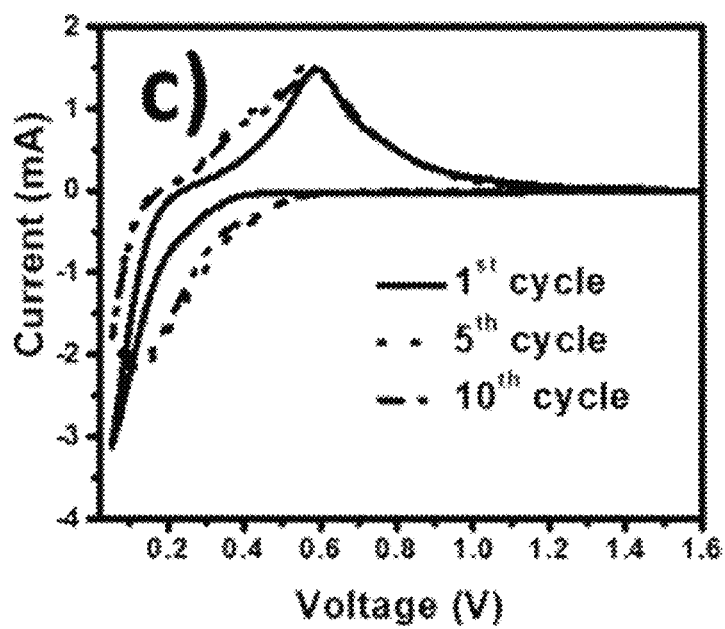
FIG. 5C is a cyclic voltammogram of Si vs. Li/Li+ in the potential range of 0.05-1.5 V at a scan rate of 0.1 mV/s.
Figure 5D:
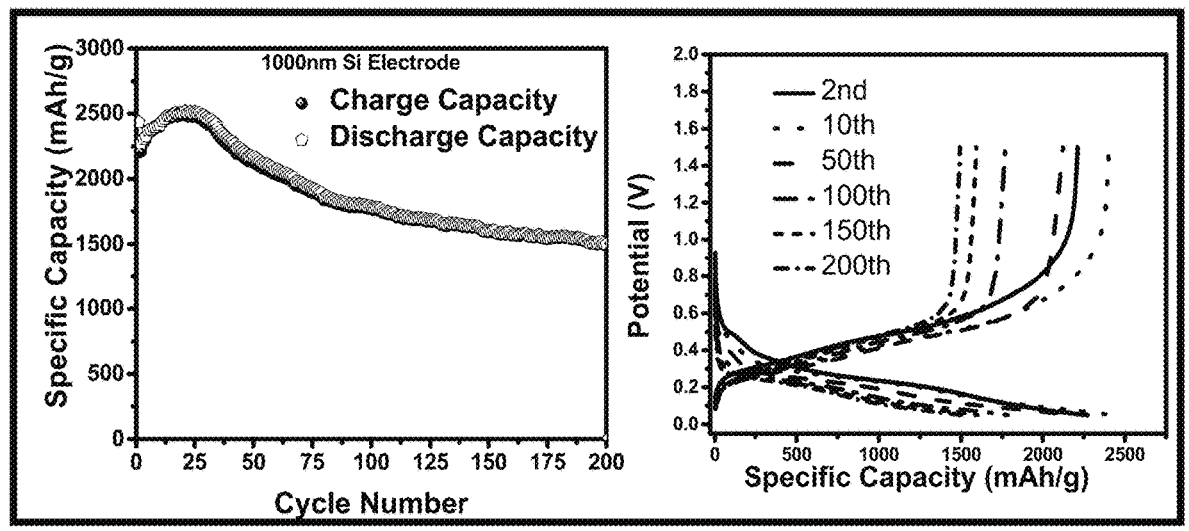
FIG. 5D is a graphical representation of cycling performance of a 3D silicon electrode at a current rate of 0.2 C.

FIG. 5C represents the cyclic voltammograms of 3D Si electrode in the potential range of 1.5-0.05 V vs. Li/Li$^+$ at a scan rate of 0.1 mV s$^{-1}$. A distinctive difference between the first and second cycle is due to the formation of solid-electrolyte interface (SEI), generally associated with the film-like growth during initial lithiation of silicon electrode. The large current in a first backward scan from 340 to 50 mV is attributed to Li-rich Li—Si phase, the reduction in peak currents and broadening of the peak (490 to 50 mV) on subsequent CV scans reveal the formation of the passivation film. On the forward scan, peaks at 195, 380 and 580 mV have been observed due to the de-lithiation from the Li—Si phases. Thus, the perfect overlapping of redox peaks with repeated cycling confirms the stability and integrity of silicon electrodes. Further, charge-discharge studies of 3D Si electrode at a constant current rate of 0.2 C are performed, and the obtained results are displayed in FIG. 5D. From the inset of FIG. 5D, it has been observed that silicon electrode displayed well-defined discharge-charge plateaus corresponding to the lithiation and de-lithiation process. Herein, the consistent in voltage profiles upon cycling is characteristics of amorphous silicon coated conformally on 3D Ni current collectors. Remarkably, the capacities for first discharge and charge were 2430 and 2210 mAh g$^{-1}$ respectively, signifying a coulombic efficiency of 91% with minimal loss of capacity during SEI formation. A slight increase in specific capacity appeared for early cycles owing to the improved utilization of silicon electrode as test progress. From the cycling characteristics, a stable coulombic efficiency has been observed (99.5%) with minimal capacity fade with progressive cycling. However, capacity retention behaviour has been improved for further cycling, for instance, 16% capacity loss for second hundred cycles against 39% for first hundred cycles demonstrates the stability of 3D Si for long cycling full cell applications. Additionally, the performance at high currents such as C/2 and C-rates have specific capacities of 2210 and 1830 mAh g$^{-1}$ respectively.

Figure 6A:
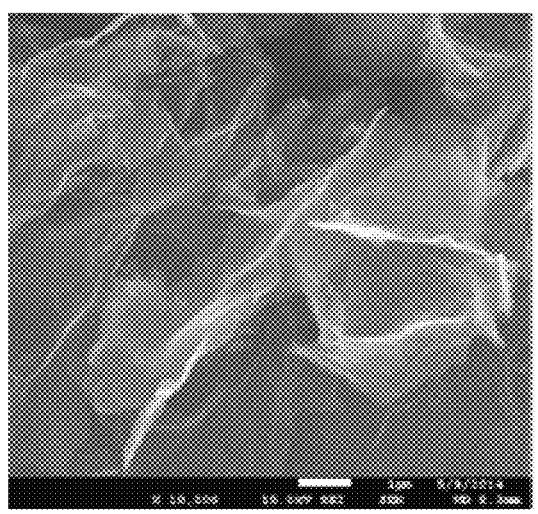
FIGS. 6A and 6B are FESEM images of pristine carbon and carbon-decorated nanoparticles, respectively.
Figure 6B:
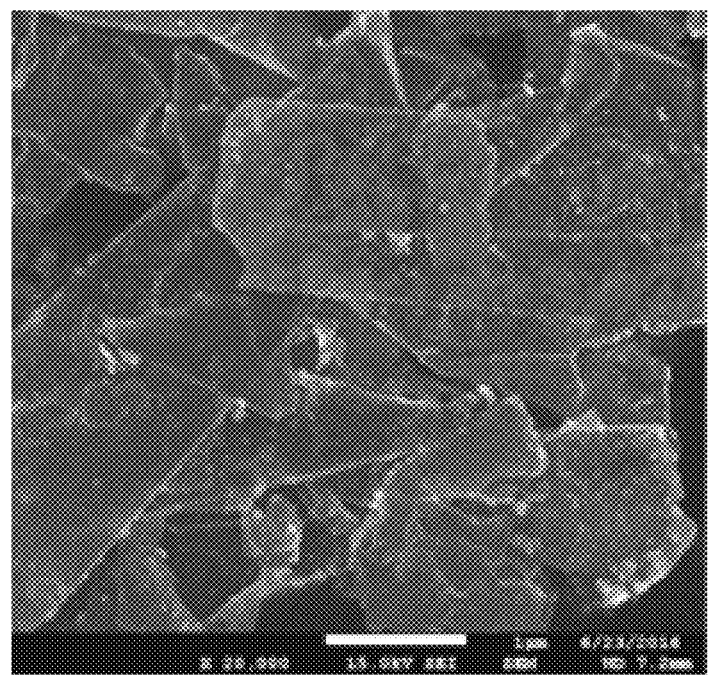

An electrocatalyst-containing graphene composite has been evaluated in comparison with porous carbon paper and pristine graphene electrodes towards LiPS conversion reactions. An active material containing lithium polysulfides (600 mM Li$_2$S$_8$) was used as a part of electrolyte and the electrode performance was measured vs. Li/Li$^+$ prior to assembling Li-ion sulfur cells against silicon. Morphological investigation of GDL carbon paper electrode suggests substantially uniform coverage of carbon fibres with oblong-shaped nanoparticles of carbon with enormous porosity. Such a porous structure with a high porosity electrode is expected to exhibit favourable performance for polysulfide batteries. An SEM image (FIG. 6A) of the graphene prepared by modified Hummers method reveals the randomly oriented graphene nanosheets with several microns in lateral size and ripple-like paper morphology. Functionalized graphene sheets (FIG. 6B) show that the spatial presence of Pt nanoparticles with the uniform size of 5 nm corroborated for an efficient glycol-reduction process. In order to have a fair comparison, the concentration and amount of LiPS (600 mM and 10 µl) and electrolyte during cell fabrication were kept constant.

Figure 6C:
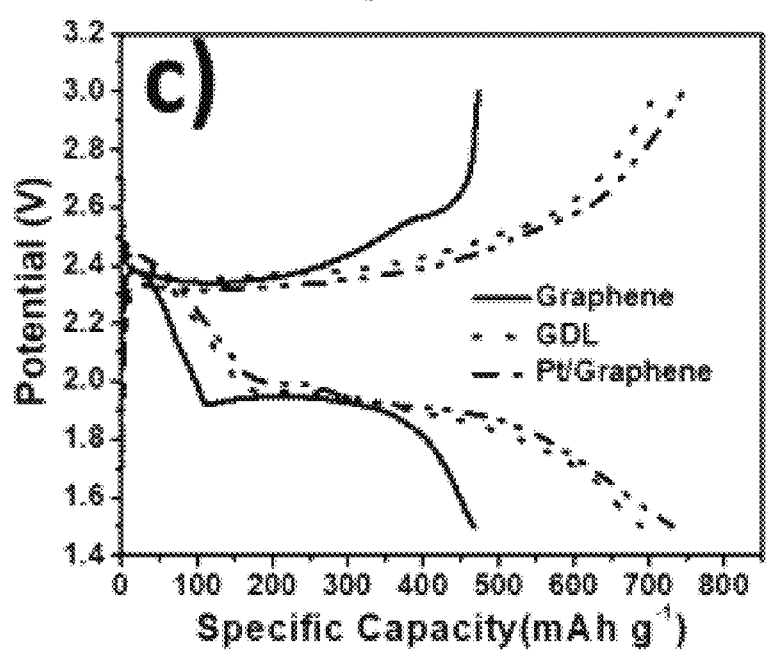
FIGS. 6C and 6D are graphical representations of the electrochemical performance of cells including the electrodes of FIGS. 6A and 6B, respectively.

FIG. 6C depicts the comparative charge/discharge plateaus of GDL carbon paper electrode, pristine Graphene and Pt/Graphene electrodes (100th cycle) in a view to understand polarization differences upon long cycling. All the electrodes exhibit two distinctive discharge plateaus at 2.4 and 2.0 V corresponding to formation of medium-chain LiPS (Li$_2$S$_n$ n≥4) and short-chain LiPS (Li$_2$S$_n$ n=1-3). Herein, electrocatalysis-induced Pt/Graphene electrode exhibits reduced polarization at any depth of discharge indicates facile reaction kinetics for LiPS conversion reactions. More notably, charging at lower potential suggests that conversion of short-chain to long-chain polysulfides, which are more electrochemically active and helps to limit the loss of active mass in the form insoluble Li$_2$S, thereby enhancing the cycle life.

Figure 6D:
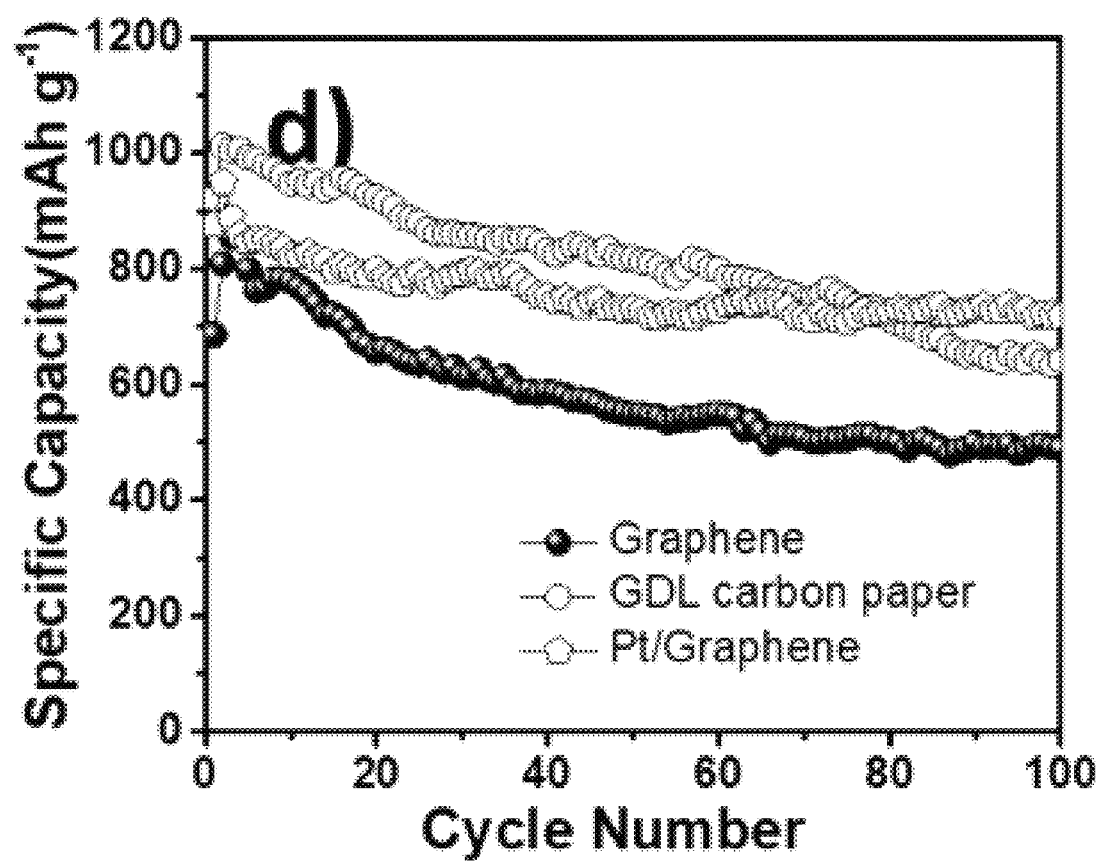

The Pt/Graphene electrode exhibits a specific capacity of 810 mAh/g at a current rate of 0.2 C while the pristine electrode shows about 620 mAh/g with a gradual capacity fade for 100 cycles (FIG. 6D). The carbon paper electrode displays higher specific capacity than the other two electrodes but gradual capacity fade upon cycling, which argues its potentiality. While initial capacities are comparable for all the electrodes, a clear difference has been seen in capacity retention over the cycling due to the incapability of adsorbing and conversion to short-chain LiPS by the pristine graphene and carbon electrodes. The stability of the capacity values for Pt/Graphene electrode is attributed to inherent properties such as high conductivity of composite, polysulfide absorption, and conversion ability, thus facile kinetics for redox reactions. At the end of the 100th cycle, Pt/Graphene electrode exhibits 732 mAh g$^{-1}$ with about 86% capacity retention, whereas pristine graphene electrode delivers as low as 471 mAh g$^{-1}$ (~50%,) representing improved LiPS reversibility. Hence, electrocatalytically active metals like Pt enhance LiPS reversibility and reaction kinetics by protecting active surface.

Figure 7A:
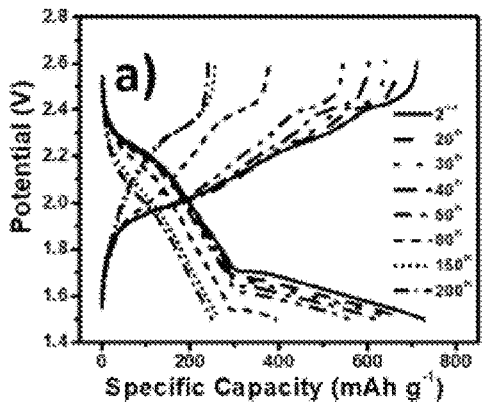
FIGS. 7A and 7B are charge/discharge profiles of Li-ion sulfur battery including a GDL carbon paper positive electrode and an electrocatalytically-active platinum/graphene composite as positive electrode, each versus $Li_xSi$, respectively.

For the fabrication of full cell Li-ion sulfur batteries, pre-lithiated 3D porous silicon was taken as anode and Pt/Graphene as cathode in a TEGDME electrolyte containing 0.6 M polysulfides. For comparison, carbon paper was used as the catalyst-free cathode to build the full cell in an identical manner to realize the effect of electrocatalysis on electrochemical performance. To balance the full cell configurations, the weight of silicon and sulfur in the form of polysulfides have been matched with respect to their individual specific capacities on half-cells. As the Li ions in the anode (silicon), the fabricated cell was in a charged state with open circuit voltage around 2.1 V, thus the test started with discharging to 1.5 V at a current rate of 0.2 C. FIG. 4a displays charge-discharge plateaus of Li-ion polysulfide battery with GDL carbon paper as cathode, wherein profiles are signature of sulfur electrode with average discharge voltage around 1.85 V. Though it exhibits high initial capacity of 750 mAh g$^{-1}$ owing to desirable porosity but gradual capacity fade with cycling indicates poor adsorption capability on sulphiphobic carbon surface. Notably, a steady increase in the polarization with cycling was possibly due to solution resistance, originating from ineffective conversion of LiPS and inherently poor conductivity of both electrodes. Furthermore, deposition of insulative species of short-chain LiPS on the electrodes' surface worsen the situation, thus the discharge plateau disappears from the voltage range investigated (FIG. 7A, 200$^{th}$ cycle). Hence, the use of high capacity electrodes such as silicon and sulfur to construct high energy density storage system, is impacted by regulated polarization via utilization of LiPS and its effective reversibility.

Figure 7B:
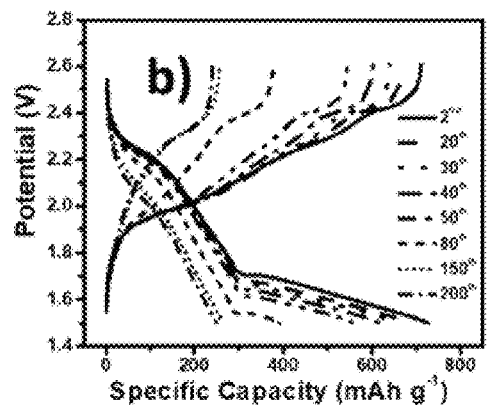
Figure 7C:
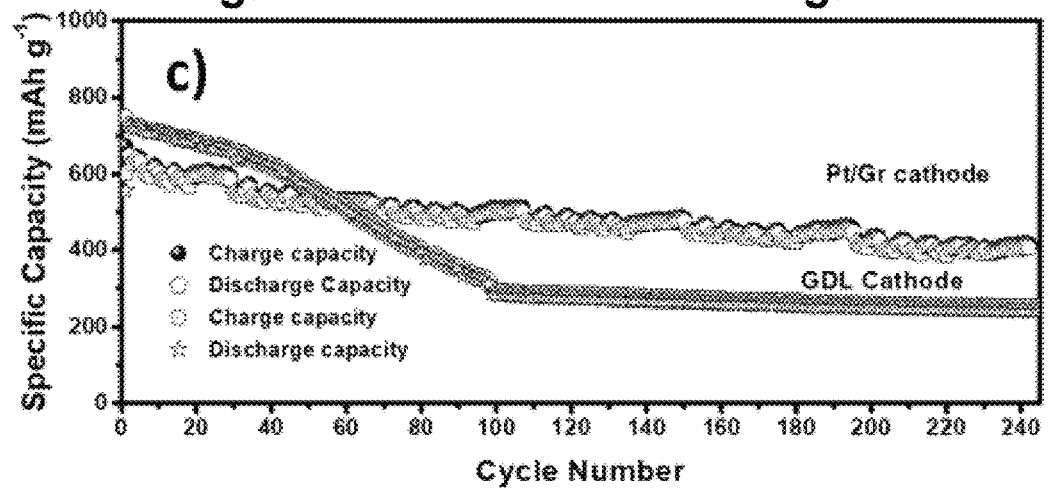
FIG. 7C is a graphical representation of the cycling performance of lithium-ion sulfur batteries at 0.5 C.

Interestingly, a catalyst-containing Pt/Graphene cathode based full cell showed minimal change in discharge plateaus with increased number of cycles, which is an indication of the enhanced reversibility of polysulfides during charge/discharge process. Herein, Pt plays a constructive role in improving reaction kinetics and thereby protecting surface active sites for further redox reactions, as understood from the voltage profiles (FIG. 7B). Furthermore, we have observed the stable specific capacity for Li-ion sulfur cell that consists of Pt/Graphene electrode with respect to specific capacity over 240 cycles, while other electrodes could endure only about 100 cycles due to accumulation of resistances. The delivered capacity is about 597 mAh g$^{-1}$ with excellent cycle life due to inherent electrochemical activity of Pt electrode, which largely have control over polarization in charge-discharge process (FIG. 7C). It is noteworthy to know that the cell exhibits almost double the energy density of commercial Li-ion batteries (450 Wh kg$^{-1}$, based on weight of both electrode materials) with 70% capacity retention even after 240 charge-discharge cycles. Characteristic charge/discharge behavior and capacity retention (compared to carbon electrode) are clear evidence for improved LiPS conversion reaction kinetics. Such exceptional performance of currently studied Li-ion polysulfide cells is attributed to catalytic activity of Pt/graphene towards LiPS conversions and 3D porous silicon electrodes.

Figure 8A:
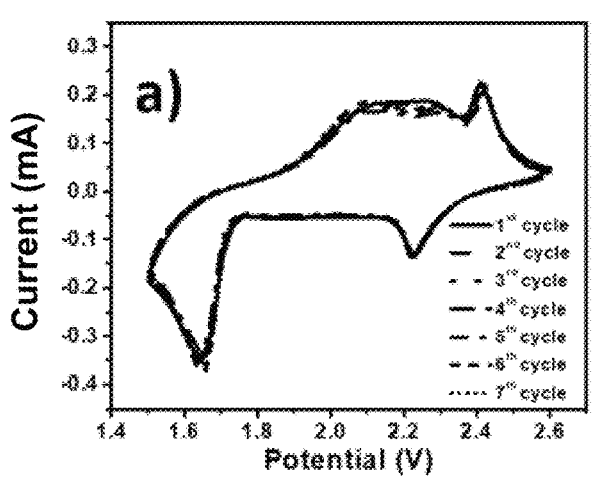
FIGS. 8A and 8B are electrochemical impedance spectra and representative cyclic voltammograms, respectively, of a lithium-ion sulfur battery including an electrocatalytically active platinum/graphene electrode.
Figure 8B:
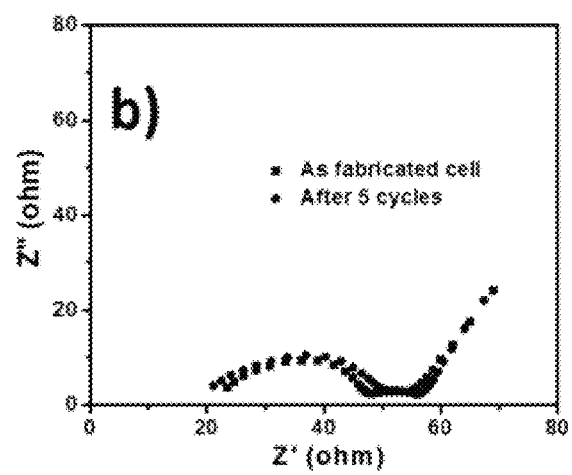

In order to understand the reversibility of lithium polysulfides conversion reactions and their impedance behavior, cyclic voltammetry (CV) and electrochemical impedance spectroscopic studies have been performed on Li-ion polysulfides configuration. FIG. 8A shows that representative CVs at a scan rate of 0.2 mV s$^{-1}$ which consist of two reduction peaks at 2.2 and 1.7 V, corresponding to elemental sulfur to higher polysulfide (Li$_2$S$_8$) and further to lower lithium polysulfides (Li$_2$S$_2$ and Li$_2$S) respectively. Upon the forward scan, a broad oxidation peak at about 2.1V and sharp peak at 2.4 V have been seen owing to reversible conversion of lower to higher LiPS and sulfur. Herein, oxidation peaks, especially the broad peak at 2.1 V is quite different than that of the sulfur half-cell (vs. Li/Li$^+$) possibly due to poor conductivity and slightly higher lithiation potential in the full cell configuration. To understand further, we have fabricated three-electrode configuration cells with platinum wire as a third reference electrode, providing all other parameters remain unaltered. Based on the results, it was concluded that the counter electrode plays a role in altering not only the shape of the CV but also shifting marginally the potentials of redox reactions. However, overlapping of curves as the number of CV scans increases strongly suggest the robustness of the system and capability of long cycling. EIS studies are used to understand the change in internal resistance and thus the polarization of charge-discharge curves in the Li-ion polysulfide system (FIG. 8B). Solution resistance is about 20Ω which is slightly higher compared to the polysulfides-free conventional electrolyte. Solution resistance remains substantially constant as cycling due to excellent reversible nature of polysulfides by electrocatalytically active electrode. This process indicates the absence of unreacted dissolved polysulfides in electrolyte. Similarly, minimal change in interfacial resistance has been observed with cycling due to facile kinetics of convention reactions originated by Pt containing electrode. Hence, the present configuration is feasible for long cycling within the operable potential window.

Electrocatalyst-containing cathode composite was used to catalyze lithium polysulfide reversibly with reduced overpotential especially with prolonged cycling. Silicon morphs into 3D porous structure and pre-lithiate to use as the metallic lithium-free anode against lithium polysulfides and Pt-graphene composite cathode. Such novel configuration of the Li-ion polysulfide battery revealed a specific capacity of 597 mAh g$^{-1}$ with 70% capacity retention over 240 cycles. Finally, the full cell exhibited an energy density of 450 Wh kg$^{-1}$ with an average voltage of 1.9 V, which is almost double the commercial Li-ion batteries.

A cell or battery of this construction may be metallic lithium-free at the negative electrode, and such a battery may be a rechargeable battery. These batteries may be high energy density sulfur or air-based battery systems, with silicon, tin, germanium, aluminum, or combinations or alloys thereof, with high theoretical capacity and lower alloying/de-alloying potential. The electron may have a controlled, three-dimensional porous structure, in order that the active surface may be increased, and that the electrode may tolerate stresses upon electrode expansion and contraction during cycling. The negative electrode may be a chemically or electrochemically lithiated porous negative electrode, in some aspects having a formula of Li$_x$M$_y$, with x selected from between 1 and 22, and y selected from between 1 and 4, and M being selected from among Si, Sn, Al, Ge, P, and alloys thereof. For example, Li—Si systems such as Li$_{15}$Si$_4$ (x=15, M=Si, y=4); Li$_{12}$Si$_{2.8}$ (x=12, M=Si, y=2.8); and Li$_7$Si$_3$ (x=7, M=Si, y=3) could be used as anode materials. It is noted that the values of x and y need not be integers. Such materials for the negative electrode are economical, particularly compared to relatively expensive metallic lithium. Avoiding metallic lithium increases safety and prolongs the life cycle, since dendrite formation is reduced or eliminated. The absence of parasitic reactions increases the shelf life of the battery, the construction increases coulombic efficiency at high charge/discharge current, and overall the cell or battery has an enhancement in volumetric energy density and a gravimetric energy density three to five times higher than that of currently available Li-ion batteries, including thin film batteries.

A Li-ion sulfur/air system may include the combination of positive electrodes containing solid sulfur, or carbon-sulfur composites, or electrocatalytically active material with lithium polysulfides as an active species, and may be fabricated under air or oxygen gas flow.

The cell or battery may include a negative electrode having a nanoscale thickness, and may be fabricated in conjunction with an electrocatalytically active metallic thin film as a positive electrode, thereby resulting in a thin film battery, having micrometer thickness. The active material in such a thin film battery may be a lithium polysulfide. The positive electrode may instead be an $Li_2S$-electrocatalytically active material, or an $Li_2S$-carbon composite. The positive electrode may instead be a lithium/oxygen material.

EXAMPLES

Example 1: Preparation of 3D Si Electrodes 3D porous Ni current collectors were prepared by a galvanostatic electrodeposition method. Si was deposited on the 3D porous Ni current collectors (deposited at pH 1.5 and current-10 $mAcm^{-2}$) using plasma enhanced chemical vapor deposition (PECVD) process.

Example 2: Synthesis of Lithium Iron Phosphate ($LiFePO_4/C$)

The precursors of $LiFePO_4$ such as $CH_3COOLi$, $FeC_2O_4.2H_2O$ and $NH_4H_2PO_4$ are dissolved in diluted $HNO_3$ solution (1M). Then, the calculated amount of citric acid (3 g) was added to the solution as a chelating agent. The mixture was stirred and heated to yield the formation of a thick gel. The resultant gel was heated at 300° C. in a mixture of $Ar:H_2$ (90:10) gas for 8 hours. The resultant powder was thoroughly ground and heated further at 700° C. for 8 hours to obtain a $LiFePO_4/C$ powder.

Example 3: Electrolyte, Electrode and Cell Fabrication and Characterizations Room temperature ionic liquid electrolyte is prepared using 0.8 M of lithium bis(trifluoromethanesulfonyl)imide salt dissolved in 1-methyl-1-propylpiperidinumbis(trifluoromethylsulfonyl)imide (99%, io-li-tec) solvent. An argon-filled glove box with oxygen and water contents lower than 0.1 ppm was used to prepare the electrolyte and for coin cell fabrication. LFP electrodes were prepared using a mixture of LFP powder, poly(vinyledene fluoride) binder and Super P carbon in a ratio of 80:10:10 wt/wt % with N-Methyl-2-pyrrolidone (NMP) as a solvent. Coin cells of standard 2032 were fabricated using prepared RTIL (pip) with 3D porous silicon or LFP as working electrodes, metallic lithium as counter/reference electrode and quartz membrane separator. The full cell was balanced specific capacity-wise per unit weight, wherein LFP was 3% excess in capacity than the capacity of 3D Si in respective half cell configurations. Cyclic voltammograms (CV) are recorded in the potential range from 1.5 to 0.05 V and 4.5 to 3 V for 3D silicon and LFP respectively, using Bio-logic (VM3) electrochemical workstation. The CVs for full cells were conducted in a potential range of 3.6 to 2.4 V at a scan rate of 0.1 mV/s. Charge-discharge studies at different current rates (from C/5 to C/2 rate) were carried out in the potential range of 1.5 to 0.05 V and 4.5 to 3 V for 3D silicon and LFP correspondingly, using ARBIN charge-discharge cycle life tester. The morphology of the samples was characterized by a JSM 401F (JEOL Ltd., Tokyo, Japan) SEM operated at 3.0 kV and a JEM 2010 (JEOL Ltd, Tokyo, Japan).

As a person skilled in the art will readily appreciate, the above description is only meant as an illustration of implementation of the principles this application. This description is not intended to limit the scope of this application in that the system is susceptible to modification, variation and change, without departing from the spirit of this application, as defined in the following claims.

What is claimed is:

1. An electrochemical cell comprising:
a lithium-based cathode;
an anode that is binder-free such that the anode is free of polymeric binding agents, wherein the anode is further free of conductive agents and metallic lithium, the anode comprising:
a porous nickel current collector; and
a non-porous film coating the porous nickel current collector, the non-porous film comprising at least one of silicon, germanium, aluminum, phosphorous, tin, and lithium alloys thereof; and
the electrochemical cell further comprising an ionic liquid electrolyte in contact with the lithium-based cathode and the non-porous film, wherein the ionic liquid electrolyte is configured to interact with the non-porous film to create a solid-electrolyte interface (SEI) to at least stabilize the non-porous film;
wherein the porous nickel current collector has uniform pore size and uniform pore distribution and thickness.

2. The electrochemical cell of claim 1, wherein the anode comprises at least one of a two-dimensional nanowire, a nanofiber, a hollow spherical particle, and a nanoparticle.

3. The electrochemical cell of claim 1, wherein the porous nickel current collector is selected from a nanoporous structure, a microporous structure, and a mesoporous structure.

4. The electrochemical cell of claim 1, wherein the lithium-based cathode comprises $LiFePO_4/C$.

5. The electrochemical cell of claim 1, wherein the ionic liquid electrolyte comprises at least a piperidinium cation.

6. The electrochemical cell of claim 5, wherein the ionic liquid electrolyte further comprises a thermally stable lithium salt.

7. The electrochemical cell of claim 1, wherein the non-porous film comprises silicon substantially 0.5 micrometers thick and pore size in the porous nickel current collector is substantially 1 micrometer.

8. The electrochemical cell of claim 1, comprising at least one of a separator, a surface modifier, and an electrolyte additive.

9. The electrochemical cell of claim 1, wherein the anode comprises a compound of formula $Li_xM_y$, wherein:
Li is lithium;
M is at least one of Si, Sn, Al, Ge, P;
x is between 1 and 22, inclusive; and
y is between 1 and 4, inclusive.

10. The electrochemical cell of claim 1, wherein the porous nickel current collector is an electrodeposited Cu—Ni alloy from which the Cu component is etched out.

11. The electrochemical cell of claim 1, wherein the non-porous silicon film is a plasma enhanced chemical vapor deposited coating substantially 0.5 micrometers thick and pore size in the porous nickel current collector is substantially 1 micrometer.

12. The electrochemical cell of claim 1, wherein the cathode has a carbon coating.

13. The electrochemical cell of claim 12, wherein the carbon coating has a thickness of less than about 8 nanometers.

14. The electrochemical cell of claim 1, wherein the ionic liquid electrolyte comprises at least pyrrolidinium.

15. The electrochemical cell of claim 1, wherein the ionic liquid electrolyte comprises at least phosphonium.

16. A battery, comprising the electrochemical cell of claim 1.

17. The battery of claim 16, comprising a thin film battery.

18. An electrochemical cell comprising:
a cathode comprising at least one of $LiFePO_4$ and $LiMn_2O_4$;
an anode free of polymeric binding agents and metallic lithium, the anode comprising:
a porous nickel current collector; and
a non-porous film coating the porous nickel current collector, the non-porous film comprising at least one of silicon, germanium, aluminum, phosphorous, and tin; and
the electrochemical cell further comprising an ionic liquid electrolyte in contact with the cathode and the non-porous film, wherein the ionic liquid electrolyte, comprising at least one of pyrrolidinium, phosphonium, and piperidinium, is configured to interact with the non-porous film to create a solid-electrolyte interface (SEI) to at least stabilize the non-porous film,
and
wherein the porous nickel current collector has uniform pore size and uniform pore distribution and thickness.

19. The electrochemical cell of claim 18, wherein the non-porous film comprises silicon substantially from 0.5 to 2 micrometers thick, and wherein pore size in the porous nickel collector is substantially 1 micrometer.

20. An electrochemical cell comprising:
a cathode comprising one of lithium/oxygen and lithium/sulfur;
an anode free of polymeric binding agents and metallic lithium, the anode comprising:
a porous nickel current collector; and
a non-porous silicon film coating the porous nickel current collector; and
the electrochemical cell further comprising an ionic liquid electrolyte in contact with the cathode and the non-porous silicon film, wherein the ionic liquid electrolyte is configured to interact with the non-porous silicon film to create a solid-electrolyte interface (SEI) to at least stabilize the non-porous silicon film,
wherein the porous nickel current collector has uniform pore size and uniform pore distribution and thickness.

21. The electrochemical cell of claim 20, wherein the anode is a nanoscale anode.

* * * * *